US012633224B2

(12) United States Patent
Haider et al.

(10) Patent No.: US 12,633,224 B2
(45) Date of Patent: May 19, 2026

(54) METHOD AND SYSTEM FOR UNMANNED AERIAL VEHICLE FLIGHT HIGHWAY

(71) Applicant: AIRMATRIX INC., Toronto (CA)

(72) Inventors: Ayaan Haider, Stoney Creek (CA);
Shayaan Haider, Stoney Creek (CA);
Bashir Khan, Mississauga (CA);
Alexandra McCalla, Toronto (CA)

(73) Assignee: AIRMATRIX INC., Toronto (CA)

( * ) Notice: Subject to any disclaimer, the term of this
patent is extended or adjusted under 35
U.S.C. 154(b) by 0 days.

(21) Appl. No.: 16/661,473

(22) Filed: Oct. 23, 2019

(65) Prior Publication Data
US 2021/0125507 A1 Apr. 29, 2021

(51) Int. Cl.
| | |
|---|---|
| *G08G 5/55* | (2025.01) |
| *B64U 70/90* | (2023.01) |
| *G06F 16/29* | (2019.01) |
| *G08G 5/22* | (2025.01) |
| *G08G 5/26* | (2025.01) |

(Continued)

(52) U.S. Cl.
CPC .............. *G08G 5/55* (2025.01); *G06F 16/29*
(2019.01); *G08G 5/22* (2025.01); *G08G 5/26*
(2025.01); *G08G 5/32* (2025.01); *G08G 5/34*
(2025.01); *G08G 5/59* (2025.01); *B64U 70/90*
(2023.01);

(Continued)

(58) Field of Classification Search
CPC .... G08G 5/006; G08G 5/0013; G08G 5/0026;
G08G 5/0034; G08G 5/0039; G06F
16/29; B64C 39/024; B64C 2201/123
See application file for complete search history.

(56) References Cited

U.S. PATENT DOCUMENTS

| | | | |
|---|---|---|---|
| 6,184,823 B1 * | 2/2001 | Smith | ..................... G06F 16/29 |
| | | | 342/357.31 |
| 8,082,102 B2 | 12/2011 | Ravenscroft | |

(Continued)

FOREIGN PATENT DOCUMENTS

WO 2016/125161 A1 8/2016

OTHER PUBLICATIONS

Instrument Procedures Handbook, FAA-H-8083, Chapter 2, En Route Operations, available at: https://www.faa.gov/regulations_ policies/handbooks_manuals/aviation/instrument_procedures_ handbook/media/faa-h-8083-16b.pdf (Year: 2017).*

*Primary Examiner* — Adam D Tissot
*Assistant Examiner* — Charles Pall
(74) *Attorney, Agent, or Firm* — Benesch Friedlander
Coplan & Aronoff LLP

(57) ABSTRACT

The present invention is a system and method for a UAV flight highway and management thereof, comprising: a ground control station, a server (for example a cloud server), a geographic locator communication device, a communication transmitter, and one or more UAVs. The present invention is operable to identify ground level topography and air space objects (e.g., buildings) within a region, as well as other restrictions to UAV flights (e.g., restricted flight zones), and generates within such region a UAV flight highway, that may be multi-lane and multi-layer, based upon specific latitudinal and longitudinal points. The present invention is operable to control the flight of one or more UAVs along such flight highway, along multiple-lanes thereof, wherein the UAVs may travel at different speeds in different lanes and different layers along the UAV flight highway.

16 Claims, 9 Drawing Sheets

(51) Int. Cl.

| | |
|---|---|
| *G08G 5/32* | (2025.01) |
| *G08G 5/34* | (2025.01) |
| *G08G 5/59* | (2025.01) |
| *B64U 101/30* | (2023.01) |

(52) U.S. Cl.
CPC ...... *B64U 2101/30* (2023.01); *B64U 2201/20* (2023.01)

(56) References Cited

U.S. PATENT DOCUMENTS

| | | | | |
|---|---|---|---|---|
| 8,600,602 | B1 | 12/2013 | McAndrew et al. | |
| 9,087,451 | B1 | 7/2015 | Jarrell | |
| 9,256,225 | B2 | 2/2016 | Downey et al. | |
| 9,489,852 | B1 | 11/2016 | Chambers et al. | |
| 2016/0275801 | A1 | 9/2016 | Kopardekar | |
| 2016/0307447 | A1* | 10/2016 | Johnson | B60L 58/12 |
| 2016/0313736 | A1* | 10/2016 | Schultz | G05D 1/0094 |
| 2016/0328979 | A1 | 11/2016 | Postrel | |
| 2018/0275647 | A1* | 9/2018 | Li | G06F 3/04845 |
| 2018/0276995 | A1* | 9/2018 | Priest | G08G 5/59 |
| 2019/0079541 | A1* | 3/2019 | Tao | G08G 5/32 |
| 2019/0340934 | A1* | 11/2019 | Villa | G08G 5/22 |
| 2019/0354116 | A1* | 11/2019 | Shomin | A63K 1/00 |
| 2020/0035111 | A1* | 1/2020 | Butler | G08G 5/57 |

* cited by examiner

METHOD AND SYSTEM FOR UNMANNED AERIAL VEHICLE FLIGHT HIGHWAY

FIELD OF INVENTION

This invention relates in general to the field of methods and systems for unmanned aerial vehicle (UAV) flight highways and the management thereof, and more particularly to a UAV multi-lane and multi-level flight highway and management thereof.

BACKGROUND OF THE INVENTION

Unmanned aerial vehicles (UAVs) are increasingly flown in the skies around the world, both in rural and urban areas. The flight of UAVs, and in particular when an UAV is flown beyond the visual line of sight of its controller, can create risks for other flight vehicles, including other UAVs, airplanes, gliders, helicopters, etc. Such risks can include risks of collisions, risks of flight path deviation to avoid collisions, and risks to property, whether being damage to other flight vehicles, or to buildings or property at a height from, or at, ground level. Various prior art approaches have been developed to address risks posed by the flight of UAVs and UAV traffic management.

An example of such a prior art approach is U.S. Pat. No. 8,082,102, issued to The Boeing Co. on Dec. 20, 2011, that discloses methods, tool, and techniques for computing flight plans for UAVs. The invention requires input of a destination for said UAVs, and data representing obstacles in the form of a map. The invention processes this information to output a form of trajectories and dimensions utilized by a UAV to travel from one destination to another. In particular, the invention computes flight plans to incorporate such trajectories and thereby sets limits on where a UAV can and cannot fly. The method of the invention also determines if there is any intersection between a flight path and obstacles, for the purpose of determining whether any rerouting of UAVs is required. The invention can further take into account temporary flight restrictions to adjust trajectory calculations. This invention does not operate to create flight paths for multiple UAVs to fly simultaneously. It further does not incorporate a communication method between any device and the UAV, or any means of executing the actual flight, such as any command and control mechanism.

Another example of a prior art approach is U.S. Patent Application Publication No. 2016/0328979 filed by Richard Postrel on Jul. 15, 2015 and published on Nov. 10, 2016 that discloses a UAV traffic management system incorporating a computer operable for storing origin coordinates of a UAV, destination coordinates and traffic management factors that exist between an origin location and a destination location. The computer is further operable to process UAV flight control. The system calculates a flight path and executes the flight of the UAV along the flight path from the set origin location autonomously by sending the flight path to the UAV, receiving telemetry data as the UAV executes a flight mission. The system takes into account traffic, the UAV's current location along the flight path and is operable to recalculate the flight path and transmit such recalculated flight path to the UAV. This invention does not operate to create flight paths for multiple UAVs to fly simultaneously. It further does not require longitudinal and latitudinal pinpoint accurate datapoints to be identified for the flight path.

Another example of a prior art approach is U.S. Patent Application Publication No. 20160275801 assigned to USA as Represented by the Administrator of the National Aeronautics & Space Administration (NASA) on Dec. 19, 2014, and published on Sep. 22, 2016, that discloses a traffic management system for managing unmanned aerial systems (UASs) operating at low-altitude. The invention is operable to perform surveillance for locating and tracking UASs in uncontrolled airspace, for example, in airspace below 10,000 feet above mean sea level (MSL). The invention further is operable to recognize flight rules for safe operation of UASs in uncontrolled airspace. The invention also incorporates computers operable to process said surveillance and apply the flight rules to UASs. This invention does not disclose command and control over UAV motors to enforce geofencing and pathways, and is not directed to route optimization (instead it is directed to traffic management to prevent flights over an area (e.g., a military location). It further is limited in application to airspace below 10,000 feet above MSL.

Another example of a prior art approach is U.S. Pat. No. 9,489,852 assigned to Zipline International Inc., issued on Nov. 8, 2016, that discloses a UAS configured to receive a request from a user and to fulfill such request using an UAV. The UAS is operable to select a distribution center that is within range of the user, and to deploy a suitable UAV to fulfill the request from such distribution center. The UAS is configured to provide real-time information about the flight route to the UAV during its flight, and the UAV is configured to dynamically update its flight mission based on information received from the UAS. This invention does not disclose a UAV traffic management system, but rather is directed to a UAV delivery logistics system for transporting goods.

Another example of a prior art approach is U.S. Pat. No. 9,256,225, assigned to Unmanned Innovation, Inc., issued on Feb. 9, 2016, that discloses a system for UAV authorization and geofence envelope determination. One of the methods includes determining, by an electronic system in an UAV, an estimate of the fuel remaining in the UAV, and estimating the fuel consumption of the UAV. These estimations are processed with the wind speed (as measured by sensors incorporated in the UAV) to estimate a flight time remaining for a current flight plan, and one or more alternative flight plans to accommodate the estimated remaining fuel. An alternative flight plan is selected if the UAV will not complete its current flight plan based upon the estimated fuel remaining. This invention does not disclose a UAV traffic management system.

Another example of a prior art approach is U.S. Pat. No. 8,600,602, assigned to Honeywell International Inc., issued on Dec. 3, 2013, that discloses two architectures for UAVs and a method for executing a flight mission plan. One architecture for a UAV includes a flight command and mission execution (FCME) component operable to make strategic decisions, a flight technical control manager (FTCM) operable to make tactical decisions, and a vehicle management system (VMS) operable to provide navigational support, wherein the FCME and the FTCM execute on one processor and the VMS executes on a separate processor. The second architecture for a UAV incorporates redundant processors for executing the FCME and FTCM as well as redundant processors for executing the VMS. The UAV executes a flight mission plan and may control various optical sensors, training sensors and lights. This invention relies upon a specific software architecture that is not reflected by the present invention.

Another example of a prior art approach is U.S. Pat. No. 9,087,451, issued to John A. Jarrell on Jul. 21, 2015, that discloses a method of communicating with a UAV by transmitting messages bilaterally via a communications transmitter of a lighting assembly. A first message transmitted to the UAV from the lighting assembly includes an identifier associated with the lighting assembly, and the lighting assembly being located within proximity of a roadway. The UAV sends a second message to the lighting assembly that includes an identifier associated with the UAV. A third message is sent from the lighting assembly to the UAV that indicates an altitude at which the UAV should fly. This invention does not disclose a UAV traffic management system, whereby a UAV can fly in a flight path unrelated to any lighting assembly.

Another example of a prior art approach is PCT Application Publication No. WO/2016/125161, filed by Moshe Zach on Mar. 2, 2016, and published on Nov. 8, 2016, that discloses a flight management system for UAVs, operable to equip a UAV for cellular fourth generation (4G) flight control. The UAV carries on-board a 4G modem, an antenna connected to the modem for providing for downlink wireless RF, and a computer is connected to the modem. The invention incorporates a 4G infrastructure to support the function of sending via uplink and receiving via downlink from and to the UAV. The infrastructure further includes 4G base stations capable of communicating with the UAV along its flight path. An antenna in the base station is capable of supporting a downlink to the UAV. A control centre accepts navigation related data from the uplink. In addition, the control centre includes a connection to the 4G infrastructure for obtaining downlinked data. A computer calculates the location of the UAV using navigation data from the downlink. This invention does not disclose a UAV traffic management system that identifies UAV traffic lanes.

What is needed is a UAV flight traffic management system operable to control flights of one or more UAVs occurring simultaneously or overlapping in time, along set identified flight lanes that comprise a UAV flight highway within a geographic area, that may be multi-lane and/or multi-layer, allowing for control of the flight path of a UAV along such flight highway, and the rate of speed of the UAVs along each such flight lane within the flight highway.

SUMMARY OF THE INVENTION

In one aspect, the present disclosure relates to a system for a UAV flight highway and management thereof, comprising: a ground control station operable to transmit data to and from one or more UAVs; a server operable to identify the UAV flight highway, and to transmit data to and from the ground control station; a geographic locator communication device operable to transmit data to and from the one or more UAVs; a communication transmitter operable to transmit data to and from the ground control station and to and from the one or more UAVs; and wherein the one or more UAVs are guided along the UAV flight highway through communication with the ground control station.

In another aspect, the present disclosure relates to the system, wherein the UAV flight highway system is generate to define one or more flight highway lanes that are positioned in one or more layers of flight highway lanes, each of the flight highway lanes in one of the one or more layers being equidistant from the ground.

In another aspect, the present disclosure relates to the system, wherein the one or more flight highway lanes are defined as a series of datapoints.

In another aspect, the present disclosure relates to the system, wherein the series of datapoints defining the one or more flight highway lanes are spaced in proximity to each other, whereby datapoints are in closer proximity in non-straight sections of said flight highway lanes, and in farther proximity in straight sections of the flight highway lanes.

In another aspect, the present disclosure relates to the system, wherein the proximity of the series of datapoints from each other controls the speed of each of the one or more UAVs along each of the flight highway lanes.

In another aspect, the present disclosure relates to the system, wherein the ground control station controls the flight of each of the one or more UAVs along the flight highway.

In another aspect, the present disclosure relates to the system, wherein the ground control station is operable to generate a flight path for each of the one or more UAVs in accordance with one of the following options: from the location where said UAV starts its flight to the flight highway, along the flight highway, and from the flight highway to a final destination of said UAV; whereby one of the one or more UAVs starts joins the flight highway in-flight and controls the flight of said UAV along the flight highway until said UAV exits the flight highway; whereby one of the one or more UAVs starts joins the flight highway in-flight and controls the flight of said UAV along the flight highway and from the flight highway to a final destination; or from the location where said UAV starts its flight to the flight highway, along the flight highway, until said UAV exits the flight highway.

In another aspect, the present disclosure relates to the system, wherein the ground control station may generate an altered flight path for any of the one or more UAVs in accordance with information received by the ground control station for said UAV.

In another aspect, the present disclosure relates to the system, wherein the ground control station may generate a rerouted flight highway to avoid risk to one or more of the one or more UAVs.

In another aspect, the present disclosure relates to the system, further comprising one or more landing zones where one or more of the one or more UAVs may be directed to land by the ground control station.

In another aspect, the present disclosure relates to the system, wherein the ground control station receives and monitors information relating to the battery level of the one or more UAVs.

In another aspect, the present disclosure relates to the system, wherein the ground control station displays a dashboard to an administrator use showing real-time information relating to each of the one or more UAVs.

In another aspect, the present disclosure relates to the system, wherein the dashboard provides control functions to the administrator user, including: pause control whereby the flight or one or more of the one or more UAVs is paused; play control whereby the flight of any paused UAV is resumed; return to home control whereby the flight path of any UAV is altered to route said UAV to its home location.

In another aspect, the present disclosure relates to the system, wherein the one or UAVs can move between lanes, and move between layers of the flight highway.

In another aspect, the present disclosure relates to the system, wherein: one or more lanes of the flight highway are reserved for specific types of UAVs; or one or more layers of the flight highway are reserved for specific types of UAVs.

In another aspect, the present disclosure relates to the system, wherein one or more intersections are incorporated in the flight highway, and the ground control station controls the travel of the one or more UAVs across all intersections in accordance with rules and information received from each of the UAVs.

In another aspect, the present disclosure relates to the system, wherein all of the one or more UAVs that fly along the flight highway must be registered with the ground control station.

In another aspect, the present disclosure relates to the system, wherein the server stores datapoints that are longitudinal and latitudinal pinpoint references and the flight highway is defined by a series of such datapoints.

In another aspect, the present disclosure relates to the system, further comprising a third party system integrated with the server, whereby information is transferred to and from the server and the third party system, and such information is utilized by the ground control station.

In yet another aspect, the present disclosure relates to a method for a UAV flight highway and management thereof, comprising the steps of: one or more UAVs being registered on a flight highway system that comprises: a ground control station operable to transmit data to and from one or more UAVs; a server operable to identify the UAV flight highway, and to transmit data to and from the ground control station; a geographic locator communication device operable to transmit data to and from the one or more UAVs; and a communication transmitter operable to transmit data to and from the ground control station and to and from the one or more UAVs; a request for each of the UAVs being to access the flight highway being received by the flight highway system and being approved, and a flight plan being generated for said UAV, prior to a UAV flying along the flight highway; the flight highway system monitoring information from each UAV flying along the flight highway system, and environmental information relating to the geographic region of the flight highway system, and generating either, altered flight plans, or an altered flight highway, in accordance with such information; and the flight highway system flying multiple UAVs along the flight highway simultaneously.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
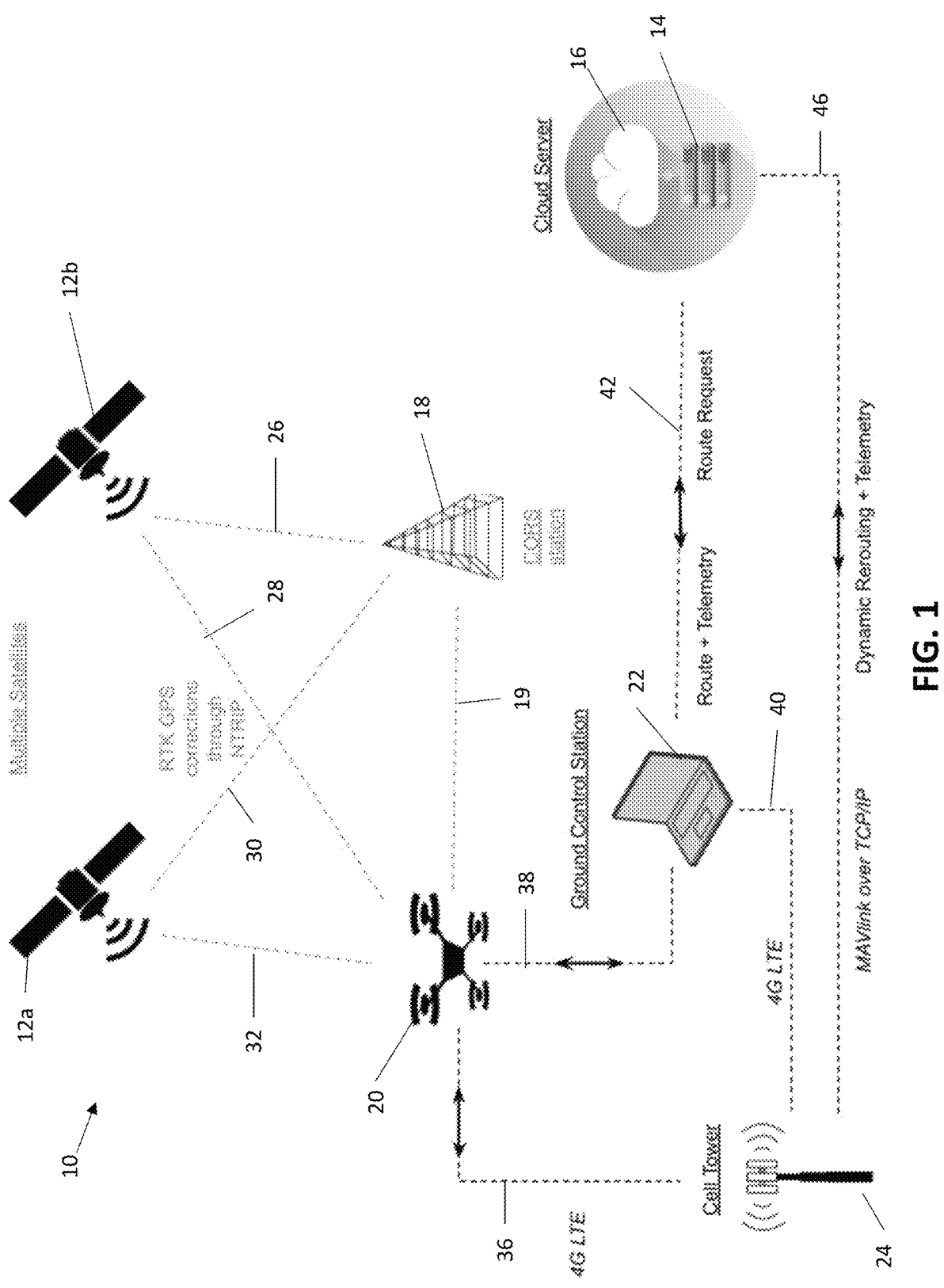
FIG. 1 is a systems diagram of the system of a UAV flight highway system of an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a system and method for a UAV flight highway and management thereof, comprising: a ground control station, a server (for example a cloud server), a geographic locator communication device, a communication transmitter, and one or more UAVs. The present invention is operable to identify ground level topography and air space objects (e.g., buildings) within a region, as well as other restrictions to UAV flights (e.g., restricted flight zones), and generates within such region a UAV flight highway, that may be multi-lane and multi-layer, based upon specific latitudinal and longitudinal points. The present invention is operable to control the flight of one or more UAVs along such flight highway, along multiple-lanes thereof, wherein the UAVs may travel at different speeds in different lanes and different layers along the UAV flight highway.

The term "UAV" as used herein means drones of any nature that are used for a variety of purposes (e.g., delivery drones, emergency drones, personal drones, etc.), air taxis, vertical take-off and landing (VTOL) aircraft, electronic vertical take-off and landing aircraft, vehicles operable in a remote traffic management (RTM) system, fixed wing vehicles, and unmanned aerial vehicles.

The terms "UAV flight highway" or "flight highway" as used herein, mean a defined route within a geographic location (e.g. a city, a municipality, etc.) along which UAVs are permitted to fly that may be multi-lane and multi-layer. Such highway being designed by the present invention, and may be altered by the present invention, to ensure that the highway is efficient and effective for UAV travel, and to avoid buildings, no-fly zones, and other limitations to UAV flight within such geographic location, as may change from time-to-time.

A reference to a "lane" of the flight highway is to a single lane wherein UAVs travel in one direction, and a reference to a "route" of the flight highway is to the whole of the flight highway, including all of its lanes and any shoulder area (as described herein). Each lane is uni-directional. Each lane is defined by a series of datapoints, as is any other portion of a flight path generated by the present invention leading to or from the flight highway.

The term "controller" references an individual or computer system that controls the flight of a UAV. For example, an individual may control the flight of a UAV, or the flight highway control system of the present invention may control the flight of a UAV. If a flight highway control system controls a flight it can control a flight along a flight path, it can reroute a flight or alter the flight path, but it cannot provide a new flight path without the UAV being operational in one of the flight highway lanes. All UAVs on the flight highway are controlled by the flight highway control system. A registered UAV can link with the flight highway control system mid-way through a flight, and be controlled by the flight highway control system for at least part of the flight. All UAVs on the flight highway must be registered by the flight highway control system. A registered UAV can leave a flight highway lane and leave the flight highway. Prior to and after leaving the flight highway, the flight highway control system may continue to control the flight of the UAV, or the flight can be controlled by another controller in the line of sight of the UAV.

The system of the present invention may be operable to detect one or more UAVs flying near one or more flight lanes of the flight highway. Such detection may be facilitated by radar sensors, wavelength sensors, or other sensor technologies. The detection may involve the sensor collecting information from or relating to the UAV that is flying close to the flight highway, and such information may be utilized by the system of the present invention to determine if such UAV is registered with the flight control system of the present invention, or not. If any non-registered UAV gets too near to the flight highway, the flight highway control system may alter the route of at least one lane of the flight highway system. The alteration would re-route at least a portion of the flight highway. The purpose of such rerouting may be to avoid a collision between the unregistered UAV and any UAVs on the flight highway. The flight highway may further utilize information collected from the non-registered UAV by the sensor, to identify the sensor and report the non-registered UAV flying near to the flight highway to local authorities, in some instances.

A UAV may be guided from a starting location (whether at ground level or above-ground, such as from a roof of a building or other above-ground location) to the flight highway, along the flight highway, and from the flight highway to a location where the flight will terminate. Alternatively, in some embodiments of the present invention, a controller of a UAV can fly the UAV to the flight highway, and the UAV will only be controlled by the system of the present invention while it is travelling along the flight highway, and the controller will control the UAV when it exits the flight highway, either to land or to conduct an in-flight activity off the flight highway, such as inspecting the exterior of a building or some other in-flight activity that is to occur off the flight highway.

The lanes of the flight highway may be located parallel to each other either vertically or horizontally, or the lanes may be non-parallel on a vertical and/or horizontal plane. Each lane may further have a set flight speed that the UAVs upon such lane will travel at, and such speeds may differ between lanes. Flight highway lanes may further be designated for the travel of particular types of UAVs, for example, such as a lane designated to UAVs conducting emergency travel (e.g., UAVs delivering medical supplies, UAVs delivering human organs, UAVs responding to a fire, UAVs sent to support paramedics by carrying supplies, or UAVs carrying other emergency items or providing other types of emergency monitoring or assistance), a lane designated for UAVs transporting commercial packages (e.g., online shopping purchases, commercial documents, or other commercial packages), and other lanes may be designated for other types of UAV travel, or mixed purpose UAV travel. In some embodiments of the present invention, lanes may be created so as to be visible to humans, such as when viewed through a particular screen, glasses or goggles. This could aid humans flying aerial vehicles (e.g., helicopters and other manned aerial vehicles) to also flight along flight highway lanes.

In some embodiments of the present invention, the visualization for flight highway lanes may incorporate augmented reality elements.

The flight highway may incorporate multiple flight highway lanes at one or more layers. Each layer on the flight highway incorporates one or more lanes positioned at a specific distance from the ground level. One or more layers may be designated for travel of a particular type of UAV.

The flight highway functions in a manner similar to a road highway for automobiles, or railway tracks for trains. It is a designated route (formed of one lane or multiple lanes) along which UAV vehicles will fly within a particular geographic location (e.g., a city, a municipality, a rural area, or some other geographic location). Rules may be applied to travel by UAVs along the flight highway, such as speeds of travel, times of travel, the type of UAVs that can travel along particular lanes, etc. Specific rules may be applied to individual lanes and/or layers of the flight highway. The route of the flight highway may further be altered in accordance with either permanent areas (e.g., new buildings, etc.) or temporary areas (e.g., a space where an airshow will be held during a particular period of time) that present limits for travel along a portion of the flight highway route. Either detours may be created (e.g., for temporary limitations), or the flight highway may be re-configured (e.g., for permanent limitations). A key difference between trains travelling along railway tracks and automobiles travelling along road highways, and UAVs flying along the UAV flight highway of the present invention, is that when travelling upon a UAV flight highway, the flight highway system of the present invention will control the travel of the UAV (e.g., its speed, its direction, etc.).

The route of the flight highway may be altered in accordance with information that is collected by the flight highway system. For example, the flight highway system may gather information regarding the use of the flight highway at particular times of day, and the congestion thereupon of UAVs, or lack thereof. The UAVs may be moved between lanes and/or layers by the flight highway controller during a flight for various reasons, such as to improve efficient travel of the UAVs along the flight highway. The information collected by the flight highway controller may be processed to determine that moving a UAV between lanes and/or layers will increase efficiency of travel. Alternatively, the owner of a UAV may request that a UAV be allowed to travel at a faster speed, such as if an emergency occurs or some other reason occurs mid-flight, and this may require the UAV to be moved to a lane and/or layer that moves at a faster speed. Alternatively, the information gathered by the flight highway system may indicate that a UAV is experiencing flight problems, and the UAV may be required to be moved to a lane and/or layer that allows for travel at a lower speed to compensate for the flight problems or to be rerouted to a landing zone.

The information gathered by the flight highway system may further indicate that the route of the flight highway must be altered, such as for example to avoid air level construction, smoke rising from a ground level fire, or a weather system, etc. The flight highway controller will be provided with the information for the altered route, and will transmit instructions to the UAVs to control the flight of the UAVs to travel along the altered flight highway route.

As the present invention applies longitudinal and latitudinal location markers to establishing and defining the UAV flight highway, the exact route of the highway can be determined to centimeter precision. In some embodiments of the present invention, the precision of the flight highway route identification is localized to a millimeter level to precise maps and to autonomous features with centimeter level precision. This allows for exactitude in the identification of the UAV flight highway location. In particular, this allows for the height of the highway from the ground to remain constant, despite topographical fluctuations at ground level (e.g., hills, gullies, valleys, etc.). The surety of the exact location and height of the flight highway, and the one or more lanes that form the flight highway, facilitates safe travel of the UAVs along the flight highway, even when significant density of travel of UAVs occurs along the flight highway simultaneously. The UAVs will be kept at a safe distance from each other by the control of speed and the exactitude of the height of the highway from the ground, and a consistent distance being maintained between the layers in the highway. This avoids damage to the UAVs, to buildings near to the flight highway, as well as damage to the ground, as can occur due to a collision of a UAV with: another UAV; or a building.

As described herein, the route of the flight highway lanes is defined by datapoints that represent specific pinpoint latitude and longitude points spaced in proximity to each other. In some embodiments of the present invention all datapoints on a layer are equidistant from the ground, and in other embodiments of the present invention the datapoints on a layer may not be equidistant from the ground.

In one embodiment of the present invention, the method of data collection to identify the route of the flight highway to millimeter level precision may be to utilize a global navigation satellite system (GNSS) receiver to collect the datapoints. A device is utilized to collect distance-based data within the specific geolocation wherein the flight highway route is to be positioned. For example, datapoints can be collected by such device at specific intervals, for example, such as 4-30 meters. The collected datapoints may be farther in proximity to each other for linear or straight portions of the flight highway lanes, and closer in proximity to each other in portions of the flight highway lanes near to intersections or that are non-linear or non-straight portions of the flight highway lanes. The spacing of the datapoints assists the flight highway controller with controlling the speed of the UAVs on the flight highway lanes. For example, datapoints that are closer together (e.g. fewer meters apart) may cause a UAV flying in such a section of a flight highway lane to fly at a slower speed than when the UAV flies in section of a flight highway lane along which the datapoints are farther apart. In this manner the spacing of the datapoints can assist with ensuring accuracy of the flight path of the UAV along the flight highway lane, and controls the speed of a UAV flying along the flight highway lanes.

Each datapoint that is collected includes the accurate latitude/longitude information corresponding to such datapoint. In this manner, each datapoint represents a pinpoint location reference. The datapoints are then processed by the flight highway system to produce a result that is a matrix of datapoints in two dimensions (2D) shown in a grid format. This grid can be overlaid with routing algorithms to generate a UAV flight highway. The one or more UAVs travelling along the flight highway will communicate with a single server and this facilitates three dimensional (3D) route optimization for the flight highway.

When a UAV flies along the flight highway lanes it will follow the datapoints, such that the center of the UAV will be aligned with each datapoint. When flying between datapoints, the UAV will attempt to remain in a position that allows it to be aligned with the next datapoint. The UAV is aligned with the datapoints by one or more sensors of the UAV that recognize the pinpoint location of each datapoint and are operable to ensure that the UAV travels so as to be aligned with each datapoint. Thus, such sensors will check the datapoint alignment more frequently when the datapoints have a closer proximity, than when the datapoints are father in proximity to each other. The increased checking caused by datapoints in close proximity, can have the effect of causing the UAV to travel at a slower speed than the UAV will travel when the datapoints are father in proximity from each other.

The UAV flight highway of embodiments of the present invention, is a three-dimensional (3D) route optimization layer that is operable to command and control multiple UAVs in rural or urban areas. The UAV flight highway is a predefined route in the sky made up of one or more lanes and one or more layers, however, it is subject to alteration as required, as described herein. Elements of the flight highway include that: it is developed such that the route is defined by accurate datapoints that are collected within the region through a process that defines the route in accordance with specific longitudinal and latitudinal points; 3D route optimization is applied such that the flight highway is optimized for travel by one or more UAVs simultaneously; the flight highway system is operable to command and control multiple UAVs along the flight highway simultaneously; and travel of one or more UAVs may be paused by the flight highway system, as required to permit travel of emergency services along the flight highway as required to respond to emergencies, control travel of UAVs through intersections, and as otherwise required to create efficient and safe travel of UAVs.

The flight highway is configured by segmenting mapped airspace into meter sized blocks where a UAV could possibly operate. Such segments are combined and layered on pathways based on air variables, such as traffic flow, real time construction and weather. The output of the combination is then integrated with applicable safety and governance features. The flight highway therefore provides a platform that leverages UAV traffic management and autopilot software so that UAVs can access autonomous flight corridors in the skies.

The flight highway system is operable to achieve communication with UAVs, and also to create UAV-to-UAV communication. The flight highway system further incorporates safety features, for example, such as UAV parachute deployment and failsafe redundancy measures that the flight highway controller can achieve. This reduces the risk of damage to property located near or beneath the flight highway.

The present invention further incorporates a method for collecting data relating to the use of the flight highway by UAVs. This data can be utilized to further optimize the route of the flight highway and to alter such route as required to increase efficiency and safety of the highway of UAVs.

Information regarding the function of particular UAVs can further be gathered and analyzed by the present invention to determine the efficiency of particular UAVs (e.g., battery life efficiency, fuel efficiency, ability to function in particular types of weather (e.g., strong winds, heavy rains), etc.). This information can be utilized for the development and improvement of UAV technology.

When UAVs are in-flight along the flight highway, owners of the UAVs, as well as officials of the geographic location (e.g., city employees, municipal workers, etc.) within which the flight highway is defined (e.g., a city or municipality, etc.) may view information relating to the flight of one or more UAVs along the flight highway.

An owner of a UAV may view, a real-time map showing the position of the UAV upon the flight highway (depicted as a location within the map). The route that the UAV is to travel may be shown (depicted as a route upon the map). Telemetry information may be displayed, for example, such as the UAV identification, the altitude of the UAV, the speed at which the UAV is travelling, and the fuel level or battery charge of the UAV. The starting location, where the UAV initiated its flight, may be shown (depicted as a location within the map), as may be the destination location where the UAV is intended to fly to (depicted as a location within the map). The type of flight that is to occur (e.g., the mission type) may also be indicated (e.g., mission types may include: emergency services, transport of a commercial package, filming expedition, etc.). If the owner owns several UAVs the information for each of the owner's UAVs may be shown to the owner upon a single map and screen, in some embodiments of the present invention.

An official of the geographic location may view the same information as is shown to an owner of a UAV. The official may further view information for all of the UAVs flying within the geographic location owned by multiple owners. Filters may also be applied to the information displayed to an administrator or owner user, such as to filter the types of UAVs that are shown to the official in some embodiments of the present invention (e.g., filters to show only emergency services UAVs, or to show one particular UAV having a specific identification, or to show all of the UAVs of a particular owner (e.g., all the UAVs of a particular company), or other filters). The official may further have access to command and control options (C2), whereby traffic upon the flight highway can be affected, such as a pause, play or return to home options that control the flight of one, multiple or all UAVs in the flight highway.

In some embodiments of the present invention, these controls may be human controlled (whereby a human controller implements the controls, and can control the flight of one or more UAVs in accordance with such controls). Alternatively, in some embodiments of the present invention, these controls may be human in the loop controls, whereby a human provides some basic command input, such as indicating the starting and ending point of a flight, and the flight highway control system determines the flight path, re-routing of the flight path, and implementation of any C2 controls, during the flight. The C2 controls may be presented to a controller as one or more buttons that a controller can select.

The pause option when selected will pause all or some of the traffic upon the flight highway (e.g., the flight of one UAV, traffic upon certain lanes of the flight highway to allow for faster travel of emergency services UAVs, the flight of all UAVs of an owner, etc.). For example, UAVs caused to pause along the flight highway may hover about the position where the UAV was located when said UAV was paused.

The pause option may not apply to UAVs that are not operable to hover (e.g., VTOL aircraft). A UAV that is not operable to hover may be controlled by the flight highway controller to change lanes to another flight highway lane where the UAV will not be paused. The lane to which such UAV is moved may be on the same flight highway level as the UAV was previously flying upon, or the UAV may be moved to fly upon a lane that is in a different flight highway layer (either above or below the flight highway level where the UAV was flying prior to the pause command being initiated). The pause command may pause a single UAV or multiple UAVs simultaneously. When the pause command in initiated sensors in the UAV will provide information to the flight highway controller as to the battery level of the UAV. If the UAV does not have a sufficient battery level to be paused, the flight highway controller may re-route the flight path of the UAV to another flight lane, or to cause the UAV to leave the flight highway and fly to the nearest safety landing zone, where the UAV will land.

In some embodiments of the present invention it may be possible for a controller to pause all UAV traffic on the flight highway, all UAV traffic upon a flight highway lane, or all UAV traffic upon one or more flight highway levels.

The play option when selected will cause a single UAV, or multiple UAVs, that were previously paused by operation of the pause option, to resume flying, such that each UAV continues flying along its flight path.

The return to home option when selected will cause one or more UAVs to return to their home locations, or the UAVs may request to be rerouted by the flight highway controller.

Each UAV will have a home location identified for such UAV when the UAV is registered with the flight highway controller. If no such home is identified for a UAV the system may deem another location, such as the location from where a UAV started its flight, to be the home location of the UAV for a particular flight.

If a UAV requests to be rerouted, the flight highway controller will prepare a new flight path for the UAV, or alternatively control of the UAV will be transferred to another controller.

Use of any C2 option by an official will cause the flight highway control system to generate instructions that will be transmitted to the applicable one or more UAVs to cause the UAVs to function in accordance with the C2 command chosen by said official.

In some embodiments of the present invention, the flight highway may be configured to include a "side of the highway shoulder" area, being an area to the side of a flight highway lane, whereby a UAV that needs to leave the flight highway for any reason (e.g., a malfunction, or any other reason) may be moved from a flight highway lane to the shoulder. A UAV may be rerouted from the shoulder to a landing zone, or may leave the shoulder and exit the highway to be controller by a controller user in sight line of the UAV. Alternatively, a UAV may return to the flight highway land from the shoulder. The UAV will continue to be controlled by the flight highway control system while it is upon the shoulder of the flight highway lane.

Testing

Embodiments of the present invention incorporate a hardware agnostic, secure, and autonomous control system for unmanned traffic management for UAVs. To design the flight highway control system for such an embodiment, the following tests were performed.

An aerial map system was developed for a UAV, as was a generic platform operable to control the UAVs through the aerial flight highway. Thus, the first objective of the project to develop the present invention was to design the means to accurately measure and create a highly precise millimeter-order three-dimensional aerial map system that can be processed by machine learning models. The second objective was to design the means to simultaneously connect multiple UAVs through a generic platform operable to control the UAVs through the aerial flight highways. The flight highway control system was to be operable to facilitate seamless and simultaneous communication between the flight highway control system and multiple UAVs.

At the onset of the project several technological limitations were faced in collecting spatial datapoints with high accuracy (sub-millimeter level) for designing the flight highway control system and flight highway lanes for navigation of the UAVs. Datapoint accuracy is of critical importance for the present invention, to ensure that the location of all UAVs on flight paths and flight lanes are known at all times, to ensure the flight highway and flight paths are not generated so as to cause UAVs to collide with each other or any in-air obstacle, or to fly over any no-fly zone or other area that could create danger for a UAV, etc.

Another significant technological limitation faced was in developing operability to synchronize multiple UAVs with the flight highway control platform of the flight highway control system, and communicate with all of the UAVs simultaneously or concurrently. Simultaneous control of multiple UAVs from a single platform is of critical importance for the present invention, to ensure that UAVs can be controlled constantly while flying along flight paths and lanes. This avoids collisions with of UAVs or with any in-air obstacle, and flying over no-fly zones or other areas that could create danger for a UAV, etc.

To develop an aerial map system datapoints were required to be collected in a geographic area that can be used to generate the flight highway lanes. The collection of datapoints was initially hypothesized to be achievable through the application of processes similar to traditional surveying methodologies such as LIDAR (Light Detection and Radar). However, upon an analysis of the collected data, it was recognized that traditional methods of collecting datapoints created certain inefficiencies, such as: the amount of data recorded was substantially large, making both efficient processing, and communication with the UAVs in a manner to support high-performance of such UAVs, difficult; the datapoints did not necessarily reflect a consistent distance of such datapoints from the ground surface for all datapoints in flight highway lanes or each layer of the flight highway; and obstacles between the ground and the sky could distort the accuracy of datapoint collection. The limitations that were faced led to further study, whereby methods were developed to collect the datapoints, at the distances required, in an efficient manner, and one whereby the collected datapoints could be utilized to generate a functioning and efficient flight highway system, as required for the present invention. The system developed by the inventors through this study facilitated the collection of datapoints as is necessary for the creation and function of the flight highway system disclosed herein.

While developing the flight highway control platform for the flight highway control system, another technological limitation faced was to find a way to connect multiple UAVs simultaneously or concurrently to the platform and then communicate with all of them simultaneously or concurrently. For example, UAV platforms known prior to the development of the present invention, do not allow multiple UAVs to be connected and controlled (be given commands) simultaneously. Thus, the proprietary solution of the present invention was required to be developed by the inventors to support multi-UAV functionality.

The initiative to develop a solution to connect multiple UAVs to the platform faced additional challenges, including relating to the determination as to the user datagram protocol (UDP) ports that could be used for establishing communication between the UAVs and the flight highway control system platform. The developer API (e.g., Dronecode SDK™ or MAVSDK™, which provides programmatic access to the PX4 flight stack via MAVLink™) connects to all the simulation instances through default port 14540, but simulations always ran on port number 14560. As there was no available existing documentation that provided details of the UDP ports, a process of experimentation was undertaken to build prototypes to determine the appropriate UDP ports to be used to communicate back with the UAVs.

After determining the correct port numbers, the next challenge faced was in scaling this to multiple UAVs simulations. Available off-the-shelf software options all required hardcoding the number of ports needed to run the simulations and then registering each port individually. However, this solution was not efficient and scalable as the code was required to be changed and rebuilt every time additional ports were needed. To address this limitation, an approach was designed that recursively loops through the required ports and registers them automatically. This enabled automation of the process of registering multiple UDP ports for simulating and communicating with multiple drones.

Available off-the-shelf software further required that to execute the flight paths for each individual UAV, the executable file had to be run on different terminals and each port number had to be specified. This approach was not scalable and efficient as a different terminal had to be opened each time an UAV was to be controlled through the backend element of the flight highway control system. To address this limitation the inventors designed processes to enable the software to run in parallel on multiple threads. The existing software processes were split such that they could be efficiently run on multiple threads in the same server instance, thus enabling effective control of all UAVs through a single terminal.

The testing achieved the present invention that facilitates the creation of a flight highway and the simultaneous operation of multiple autonomous UAVs in high-density urban areas, and rural areas along such flight highway. The system of the present invention is operable for use by government institutions as well as private companies and individuals to manage the flights of their UAV fleet, or single UAVs, safely and efficiently.

Benefits

The present invention offers many benefits over existing prior art methods and systems. These benefits address gaps that prior art innovations in this area of art have been unable to fill.

As an example of a benefit of the present invention over the prior art, currently, in accordance with prior art innovations, there is no accuracy of position when it comes to controlling multiple UAVs in urban areas. Prior art can only achieve a level of flight position accuracy for a single UAV and requires very expensive hardware to achieve such accurate positioning. The present invention is operable to achieve flight position accuracy from a single server for multiple UAVs flying in shared airspace. The present invention further is operable to achieve 3D route optimization for UAV flight traffic (of one or more UAVs) which increases the efficiency and safety of such flights. Prior art systems cannot achieve the functions of the present invention to control multiple UAVs in flights along accurate flight positions that form a UAV flight highway.

As an example of another benefit of the present invention over the prior art, prior art UAV systems require UAVs to rely upon static location indicators (that are not configured to reflect a specific latitude/longitude pinpoint location) and the sensors of the UAV are tied to such datapoints, whereby the UAV can fly in accordance with the sensor data (e.g., vision sensors to identify obstacles to a flight path, etc.). The present invention permits the UAVs to function as autonomous vehicles. The UAVs of the present invention fly in accordance with a flight path/plan that is generated in accordance with identified datapoints within a geographic area. Thus, low visibility, snow covering obstacles, and other such events that affect the function of sensors and create risk for a prior art UAV flight, do not affect UAV flights of the present invention. Moreover, the lanes of the flight highway of the present invention are identified as a series of datapoints, and the lanes are not static, but can be rerouted as required, as described herein. The prior art does not disclose these aspects of the present invention.

As an example of another benefit of the present invention over the prior art, UAV flight paths and identification of a flight location of a UAV are generally identified in accordance with map datapoints by prior art systems, not in accordance with datapoints that are generated in relation to distance from the surface of the Earth, and latitudinal and longitudinal datapoints collected to have millimeter and centimeter accuracy. The datapoints of the present invention that are collected to determine the UAV flight highway decrease the risk of collisions of UAVs in-flight, including the collision of multiple UAVs, as well as property damage, to buildings, and at ground level, particularly in high-level density UAV flight areas. This is of particular import in certain cities that have topographies that create issues for the angles of flight highway lanes (e.g., areas with many steep hills, etc.). The present invention can process the datapoints to create a flight highway that avoids sharply angled lanes being created. Moreover, the use of datapoints allows for variations of datapoint references in lanes within the flight highway. For example, spacing of datapoints can vary between lanes, such that lanes that have lower UAV speeds may be defined by datapoints that are closer together than the datapoints used to define lanes for higher UAV speeds.

As an example of another benefit of the present invention over the prior art, prior art systems fail to utilize cloud computing features and machine learning algorithms. Embodiments of the present invention incorporate cloud computing features, that affect the speed of the transmission of information between the UAVs and the system of the present invention. The transmission of such information via cloud computing features causes the information to transfer more quickly and frequently between each UAV and the system of the present invention. Embodiments of the present invention further incorporate machine learning algorithms that allow the system of the present invention to become fully automated overtime, whereby, human interaction with, input to, or control of, the system becomes increasingly less required. Prior art systems do not apply the cloud computing features or machine learning of the present invention, and therefore prior art systems cannot achieve the benefits that cloud computing features and machine learning facilitate for the present invention.

As an example of another benefit of the present invention over the prior art, prior art systems directed to multiple UAVs are directed to use by a single organization. The present invention is operable to manage flight traffic of multiple UAVs owned by a variety of organizations and/or individuals. Therefore, the present invention can be utilized to manage UAV flight traffic within a city or other area where multiple individuals and/or organizations fly UAVs.

As an example of another benefit of the present invention over the prior art, prior art systems cannot easily adapt UAV flight routes to adjust in-flight for changes that affect a flight route (e.g., birds, no-fly zones, other obstacles, weather, etc.). Prior art systems must be aware of such obstacles prior to planning the flight path. The present invention is operable to alter the flight highway to avoid obstacles and other risks, while UAVs are in-flight. This feature of the present invention further increases the efficiency and safety of the system, by avoiding collisions with such obstacles or other UAVs, and avoid areas that pose risks to a UAV, the system can avert damages or risks to infrastructure, airplanes, etc.

As an example of another benefit of the present invention over the prior art, prior art systems do not generally incorporate functions to achieve route optimization, they are directed to surveillance and traffic management, to prevent flights over particular areas (e.g., no-fly zones near airports or military sites, etc.). The present invention is able to optimize the route of the flight highway as described herein. This has many benefits for the efficiency and safety of the UAV flights, and surrounding buildings and areas, as described herein.

As an example of another benefit of the present invention over the prior art, prior art systems that create any type of constant flight path for UAV flights generally do so at a low altitude. The present invention is operable to create lanes of the flight highway at varying altitudes and is not constricted to functioning at low altitudes. This has the advantage of allowing the present invention to function at altitudes that are above buildings and other in-air obstacles. It also allows for greater flexibility to incorporate additional lanes positioned vertically above existing lanes, as there is no limit to the height at which such new lanes can be added.

All of the foregoing are examples of some of the benefits that the present invention offers over the prior art. A skilled reader will recognize that other benefits are also provided by the present invention and embodiments thereof over the prior art.

System

The drawings provided herewith offer examples of some embodiments of the present invention, and other embodiments of the present invention are also possible.

The present invention is operable to facilitate a UAV flight highway. The route of the flight highway is identified in accordance with specific datapoints. The datapoints are collected within a specific geographic area (e.g., a city, municipality, or other area). Each datapoint represents a latitudinal and longitudinal reference point, that is a x,y point in the actual world. A device, that may be a sensor, is utilized to collect the datapoints and set the boundaries of the geographic area wherein the route of the flight highway will be identified.

The datapoints are collected at regular intervals by a device that may be a receiver, and the distance between datapoints may alter depending on the contour of the flight highway lanes. For example, datapoints may be spaced at intervals that are closer together along non-linear or non-straight portions of the flight highway lanes, and at intervals that are farther apart along linear or straight portions of the flight highway. In some portions of the flight highway lanes, the spacing of the datapoints may be at regular intervals. For example, a portion of the flight highway lane that is straight may incorporate datapoints that are regularly spaced, and then as the flight highway lane starts to transition to be less straight, the distance between the datapoints may be altered to no longer be at the same regular distance, however, through the non-straight section of the flight highway lane the datapoints may be a regular spacing from each other that is a spacing of closer proximity than the regular spacing at the straight portion of the flight highway lane. Thus, the datapoints may be at different regular spacing in straight and non-straight sections of a flight highway lane, and not be spaced at regular intervals in between straight and non-straight portions of the flight highway (instead being spaced so as to gradually change from the spacing of datapoints along different types of sections of the flight highway lanes, such as linear types, non-linear types, straight types and non-straight types of sections). For example in embodiments of the present invention datapoints may be collected at intervals of 4-30 meters and the intervals between datapoints may vary along straight or linear sections of the flight highway lanes, and along non-linear or non-straight sections of the flight highway lanes, or at portions of the flight highway lanes near intersections.

The datapoints are stored in a local SD card of the receiver or other device utilized to collect or generate said datapoints, or are stored other storage means and are downloaded to the flight highway control system. The datapoints are converted either prior to download or subsequent to download, through the processing by a computer processor that is either incorporated in the receiver or other device utilized to collect or generate said datapoints, or the computer processor incorporated in the flight highway control system, to decimal degrees. In decimal degrees the datapoints are identified as latitudinal and longitudinal points that can be interpreted by latitudinal and longitudinal protocols.

The datapoints can be displayed to a user by the flight highway control system, via a screen or other display device, to show the datapoints overlaid upon a map. The flight highway control system permits a user to choose to remove some datapoints, and further allows a user to align datapoints. Generally, the system of the present invention will collect more datapoints than a necessary to generate flight highway lanes. As discussed herein, the characteristics of sections of the lanes may require datapoints to be more closely or more distantly spaced along portions of the lanes. Moreover, the proximity of datapoints from each other may increase of decrease the speed that a UAV can fly along a portion of a flight highway lane.

The flight highway control system may utilize software commands to process the datapoints and map, to generate an output that shows elements within the geographic area that are relevant to the flight highway (e.g., buildings within the flight are, no-fly zones, areas to be avoided (e.g., fire zones, etc.), and other elements relevant to the flight highway). For example, elements such as ground level roads appearing on the original map with which the datapoints were overlaid may be removed. Software such as Java Open Street Map Editor (JOSM) software, proprietary software, Excel™ MACROS scripts, and/or other software may be utilized to process the datapoints and map, to produce the output generated by the present invention.

The map/datapoints results may further be tagged to identify datapoints for flight highway lane routes. The tagging may be conducted utilizing JOSM proprietary software and/or other software, as well as map function software elements that provide additional function, for example, such as WAYS™ tools, or other map function tools. The tagged datapoints can be sorted and elements of the datapoints can be named to identify aspects of the flight highway, such as a routes, lanes, stop signs, etc. For example, a stop sign may function to cause a UAV to stop forward movement and hover in a static or nearly static position, u-turn, or move in a vertical (up and down) direction for a period of time. Once tagging is completed a .pbf file or other type of map file is generated by the flight highway control system, and such file is utilized by the system to create flight path routes for UAV flights, as well as lanes along routes for the flight highway.

Figure 3:
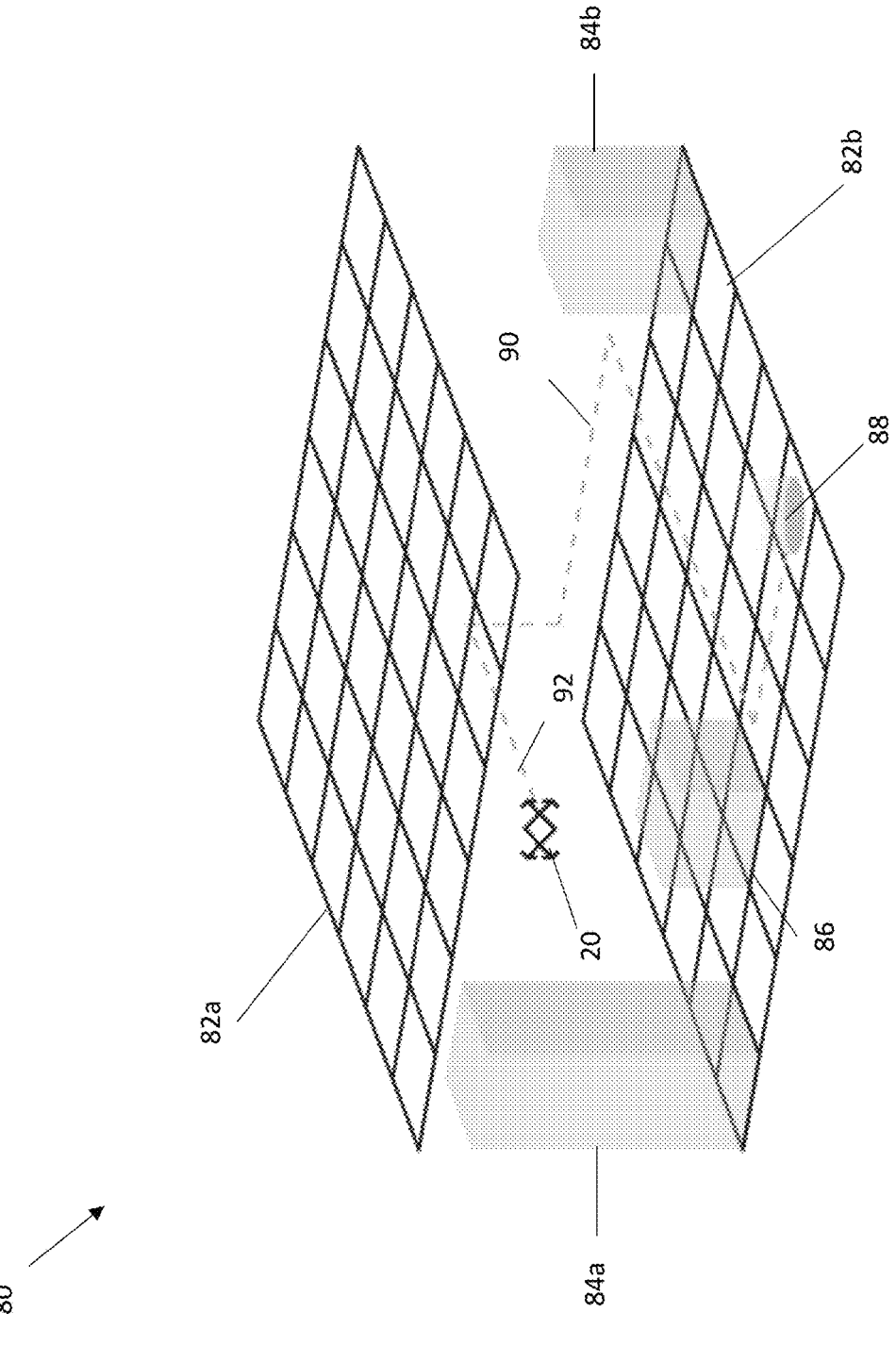
FIG. 3 is a perspective view of a flight highway of an embodiment of the present invention.

As shown in FIG. 3, the datapoints may be viewed as a overlaid format 80 showing one or more grids 82a, 82b corresponding to the datapoints overlaid with a map of a city that indicates 3D obstacles within a flight area, such as buildings 84a, 84b, 3D objects below a flight area (e.g., buildings, etc.) 86, and ground level sites (e.g., flight initiation points) 88. This view may show two or more grids at different altitudes above ground level. The grids may indicate the upper and lower levels wherein lanes may be generated for one or more layers of the flight highway. This view can be utilized to generate the flight highway 92 and the lanes therein. This view can also be utilized to generate an initial flight path 90 being the flight path from a flight starting point 88 to the flight highway 92. The initial flight path is generated if the flight highway control system will control the UAV 20 from the starting point to the UAV flight highway, along the UAV flight highway, and from the UAV flight highway to a destination point. As described herein, the flight highway control system may be utilized to control a UAV during the whole of its flight or a portion of the flight, but shall always control the UAV flight while it is flying along the flight highway.

As shown in FIG. 4, the flight highway may have multiple lanes and the lanes on each layer will be spaced a constant vertical distance from the ground. Thus, each layer of the flight highway is positioned so that the lanes therein are equidistant from the ground as well as from any other layer or layers that are above or below aid layer of the flight highway.

Figure 6:
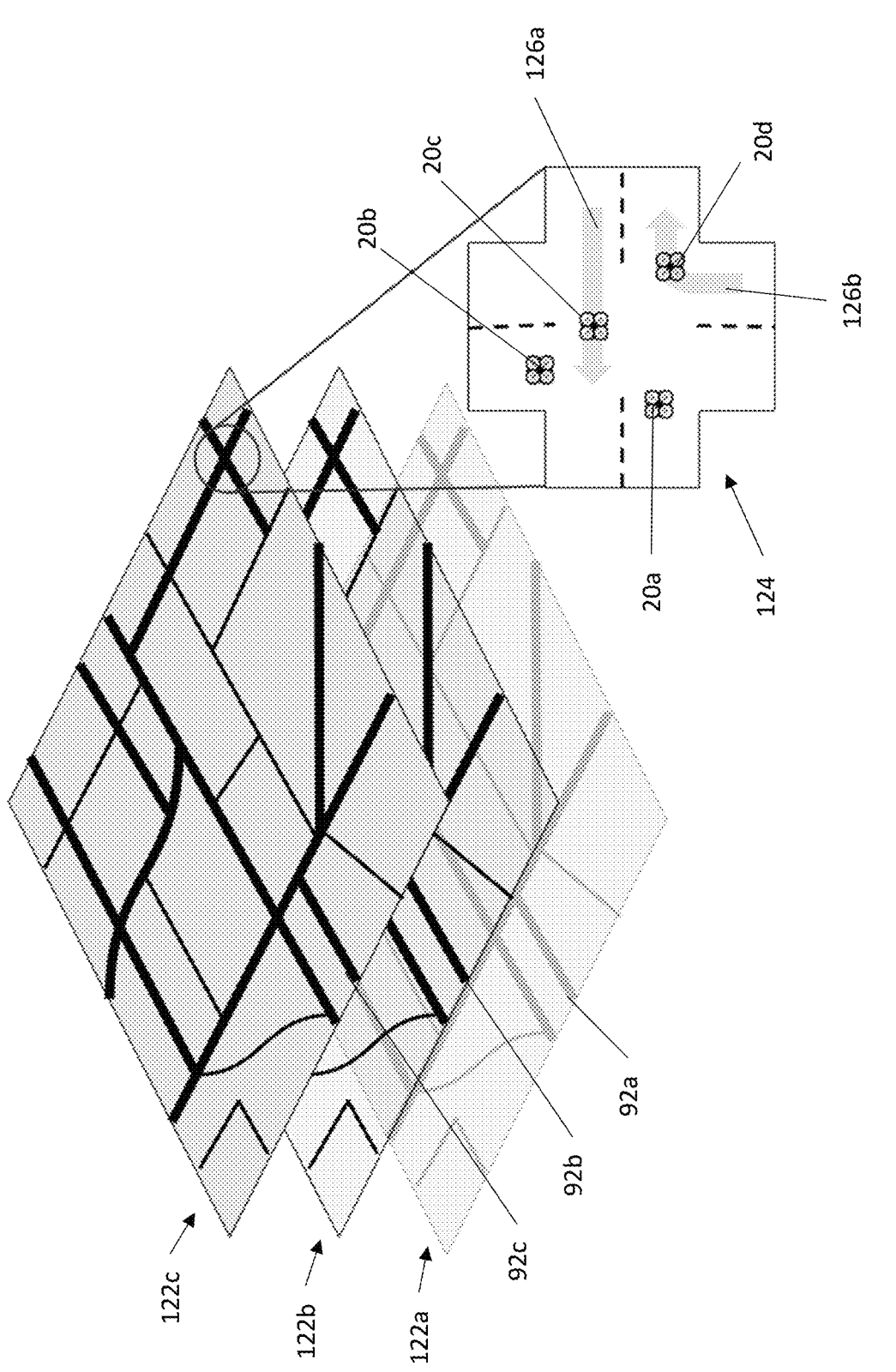
FIG. 6 is a perspective view of a multiple layer flight highway system of an embodiment of the present invention.
Figure 9:
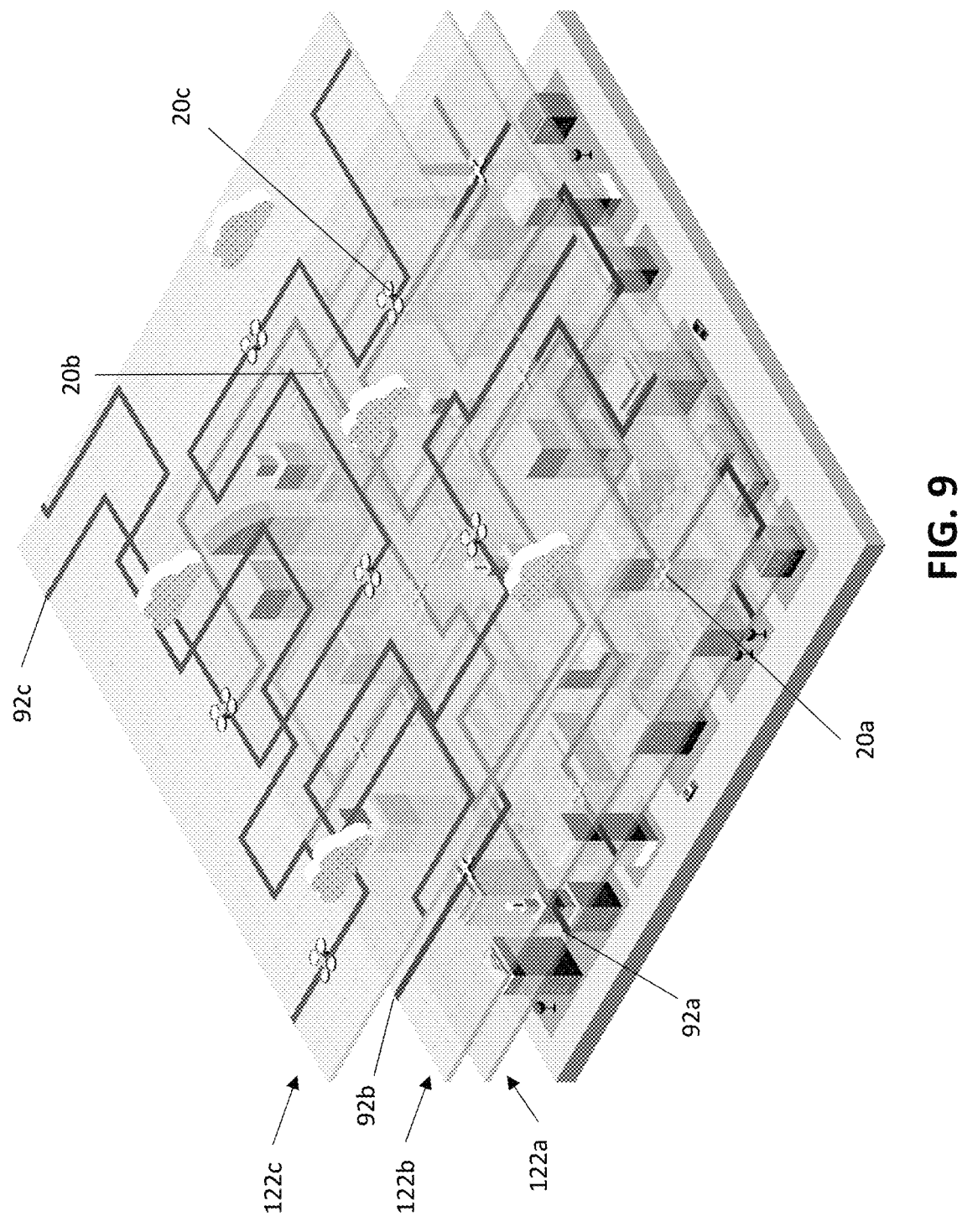
FIG. 9 is a perspective view of a three layer flight highway system of an embodiment of the present invention.

As an example, as shown in FIG. 6, a flight highway may incorporate multiple layers 122a, 122b, 122c. Each layer may incorporate one or more flight highway lanes 92a, 92b, 92c. In some embodiments of the present invention, the flight highway lanes at each layer may be parallel to and consistent with the flight highway lanes of at least one other layer of the flight highway. As shown in FIG. 9, in other embodiments of the present invention, the flight highway lanes at one or more layers may not be parallel to or consistent with the flight highway lanes of any one or more layers of the flight highway.

The flight highway lanes may incorporate one or more intersections 124, where at least two flight highway lanes intersect. As shown in detail in FIG. 6, one or more UAVs flying along flight highway lanes may come into proximity of each other at an intersection 124. The flight highway controller may apply flight rules to such UAVs 20a, 20b, 20c, 20d. Examples of such rules are identified in accordance with arrows 126a, 126b. For example, a UAV may continue to move along the same flight highway lane and pass through an intersection, as indicated by arrow 126a. A UAV may also turn along a horizontal plane at an intersection as shown by arrow 126b, so as to leave one flight highway lane and to enter another flight highway lane. A UAV may further move along a vertical plane to leave one flight highway lane of a flight highway layer and enter another flight highway lane of another flight highway layer. A UAV 20b may be paused in flight at an intersection to allow another UAV 20c to move through the intersection. A UAV 20a may be paused at an intersection if another UAV 20*d* is turning onto a flight highway lane in front of such UAV. The flight of any paused UAV may resume when the flight highway controller deems it safe for a UAV to pass through an intersection (e.g., no collision with another UAV will occur).

Figure 7:
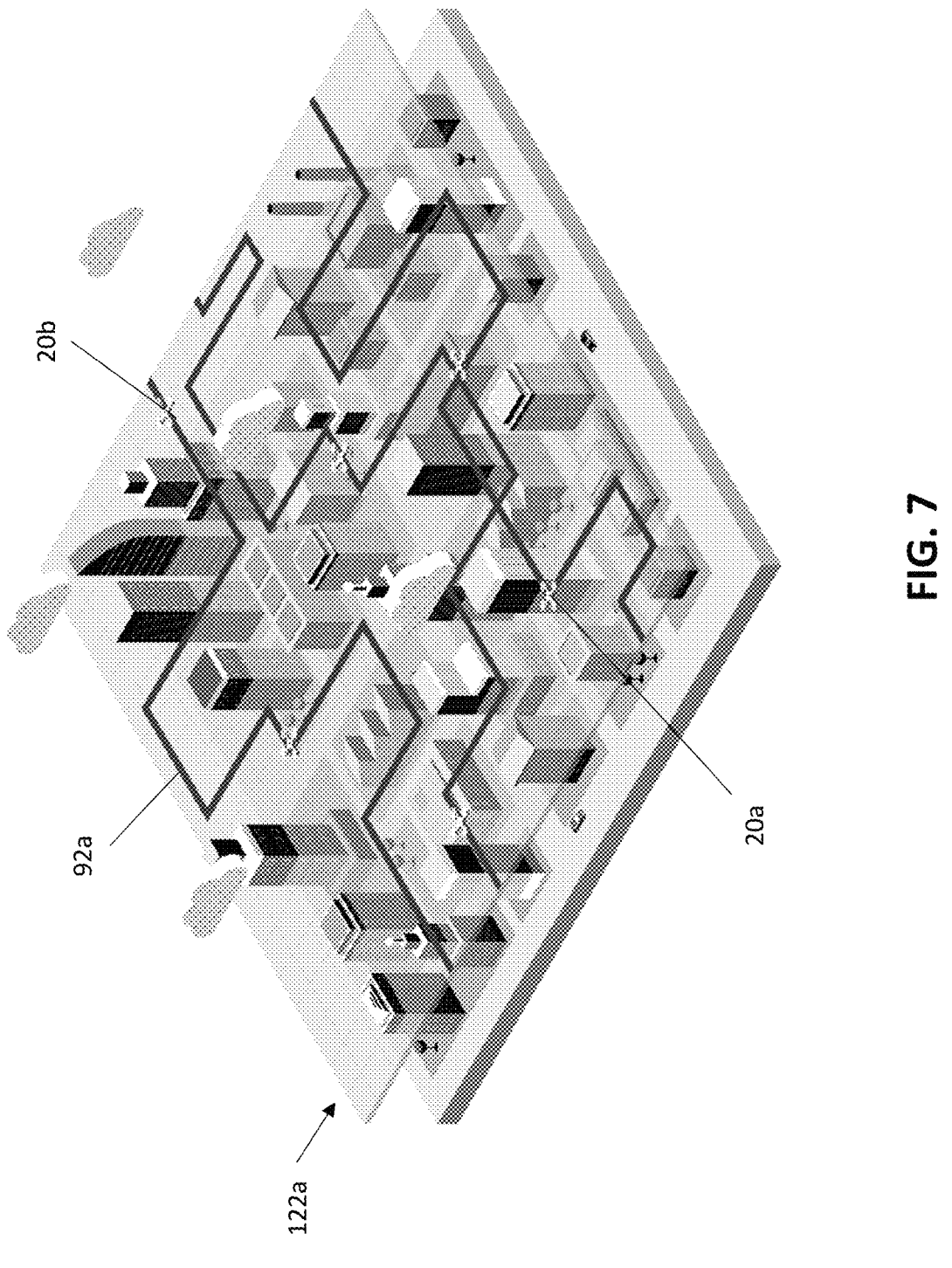
FIG. 7 is a perspective view of a single layer flight highway system of an embodiment of the present invention.
Figure 8:
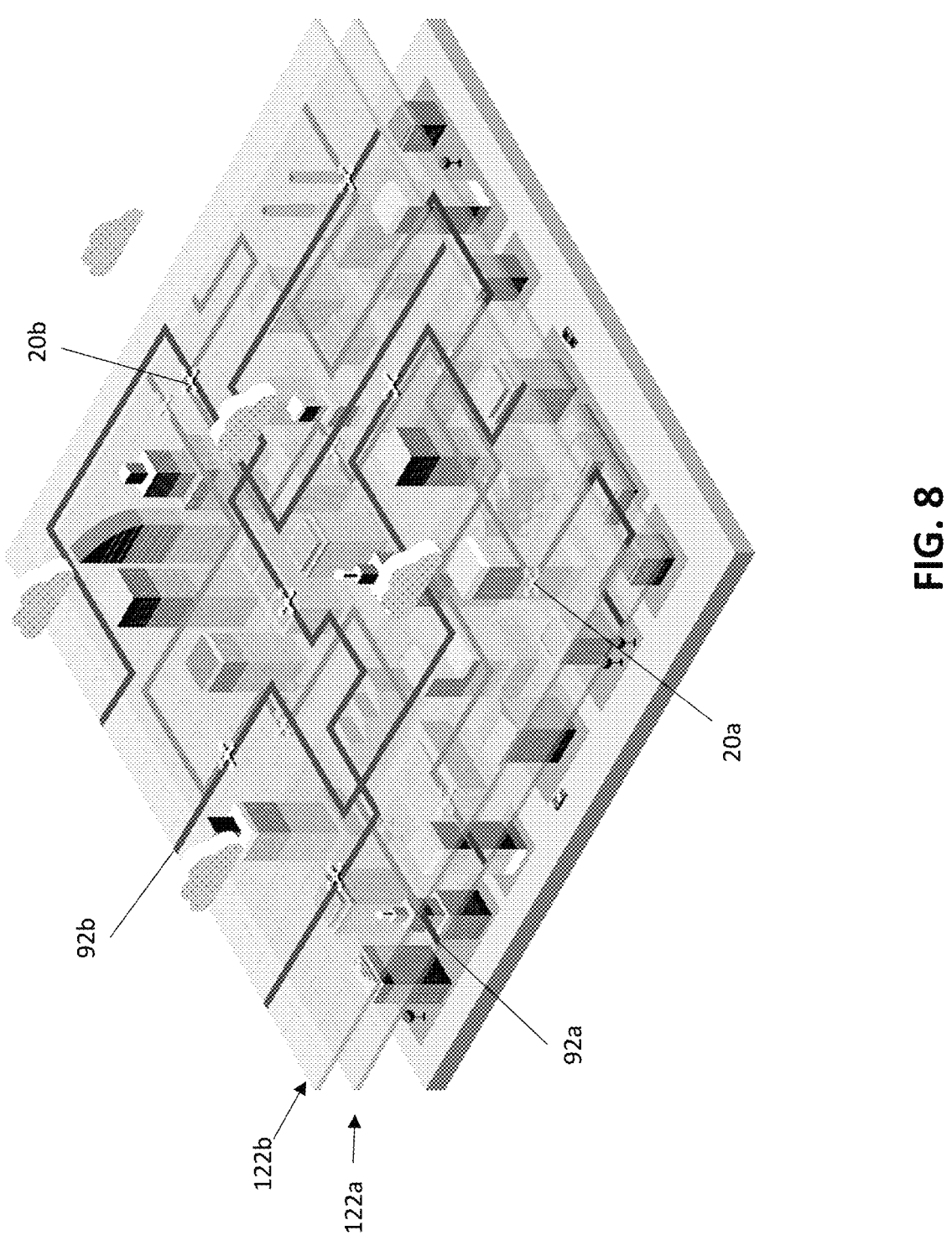
FIG. 8 is a perspective view of a two layer flight highway system of an embodiment of the present invention.

As shown in FIGS. 7-9, embodiments of the present invention may incorporate one or more layers. The base layer 122*a*, positioned closest to the ground, as shown in FIG. 7, incorporates one or more flight highway lanes 92*a* positioned equidistant from the ground, along which one or more UAVs 20*a* can be in-flight at a point in time.

As shown in FIG. 8, at least one additional layer 122*b* can incorporate one or more flight highway lanes 92*b* positioned equidistant from the ground, and from the one or more layers in the flight highway. One or more UAVs 20*b* can be in-flight at a point in time along the additional layer, and at least one or more UAV 20*a* can be in-flight at the same point in time along at least one of the flight highway lanes of the base layer.

As shown in FIG. 9, another layer 122*c* can incorporate one or more flight highway lanes 92*c* positioned equidistant from the ground, and from the one or more layers in the flight highway. One or more UAVs 20*c* can be in-flight at a point in time along the another layer. Furthermore, at least one UAV 20*a* can be in-flight at the same point in time along at least one of the flight highway lanes of the base layer, and at least one UAV 20*b* can be in-flight at the same point in time along at least one of the flight highway lanes of the one or more additional layers.

There is no set or maximum number of layers to be incorporated in a flight highway. The number of layers in a flight highway can be modified to be increased or decreased at points in time. The flight highway lanes of a layer of the flight highway can be rerouted independently of other layers, or all layers can be rerouted, depending upon the reason for such rerouting. For example, if the cause for the rerouting only affects one layer (e.g., an unregistered UAV being located close to a flight highway lane of one layer, etc.), the flight highway lanes of only the layer that is affected may be rerouted. Whereas if the cause for the rerouting affects more than one layer (e.g., smoke within part of the flight highway, high winds affecting part of the flight highway, construction occurring in one area of the flight highway, a temporary obstacle, such as a ferris wheel being erected in one area of the flight highway, etc.), the flight highway lanes of the one or more layers that are affected may be rerouted.

Vertical lanes, each positioned in a different layer, will each be at a specific vertical distance from the surface of the Earth below. For example a lane at a first layer could be 100 meters from the Earth surface, another lane in another layer could be parallel to the first lane but positioned 110 meters from the Earth surface, etc. Specific lanes in the flight highway, at a single layer or multiple layers, or lanes or portions of lanes, of the flight highway, may be for particular types of travel of UAVs, such as travel in a particular direction, travel at a particular speed, etc. The lanes, in one or various layers, could therefore also be used for different types of UAVs, such as UAV emergency service travel, commercial transport, or human transportation aerial vehicles, etc. A skilled reader will recognize that the types of lanes in a flight highway, and the rules applicable to each type of lane will vary in accordance with the UAV traffic that is to travel along such lane, the UAV technology available, and other factors. UAVs may move along a lane, controlled by the flight highway control system, and may further be moved between lanes in layers by the flight highway control system while in-flight.

Safety emergency landing zones may be positioned upon buildings along the flight highway route, upon other structures along the flight highway route, or in locations along the flight highway route (e.g., open fields and other locations where it would be safe to land a UAV). For example, a safety emergency landing zone could be located upon building 84*a* as shown in FIG. 3. Other types of landing zones may also be located in proximity to the flight highway for use by UAVs.

Landing zones of any type may be located upon an immovable objection (such as building, parking lot, etc.), or a moveable object (such as, upon a vehicle or a moveable structure). The use of moveable landing zones allows for the location of landing zones to be variable. Moveable landing zones further allow of a collection of multiple landing zones to be positioned within proximity to each other if multiple UAVs are needing to land in landing zones, at any point time, or in regions that are shown over time to be regions where multiple landing zones are required. Moreover, in a crisis situation, a moveable landing zone can allow for a landing zone to be moved so it is positioned close to a UAV that is need of landing upon a landing zone to facilitate such landing in a timely manner and avert risks.

A UAV owner or controller may choose a landing zone for a UAV. Landing zones may be public—whereby all UAVs can utilize the landing zone, or landing zones may be private—whereby only UAVs that have permission to do so can utilize a private landing zone. For example, a company may set-up one or more private landing zones where UAVs owned by the company are permitted to land. All landing zones may be identified to the present invention, but the present invention may only display the landing zones at which a UAV is permitted to land, to a particular UAV controller, user or owner.

Figures 5A, 5B, 5C:
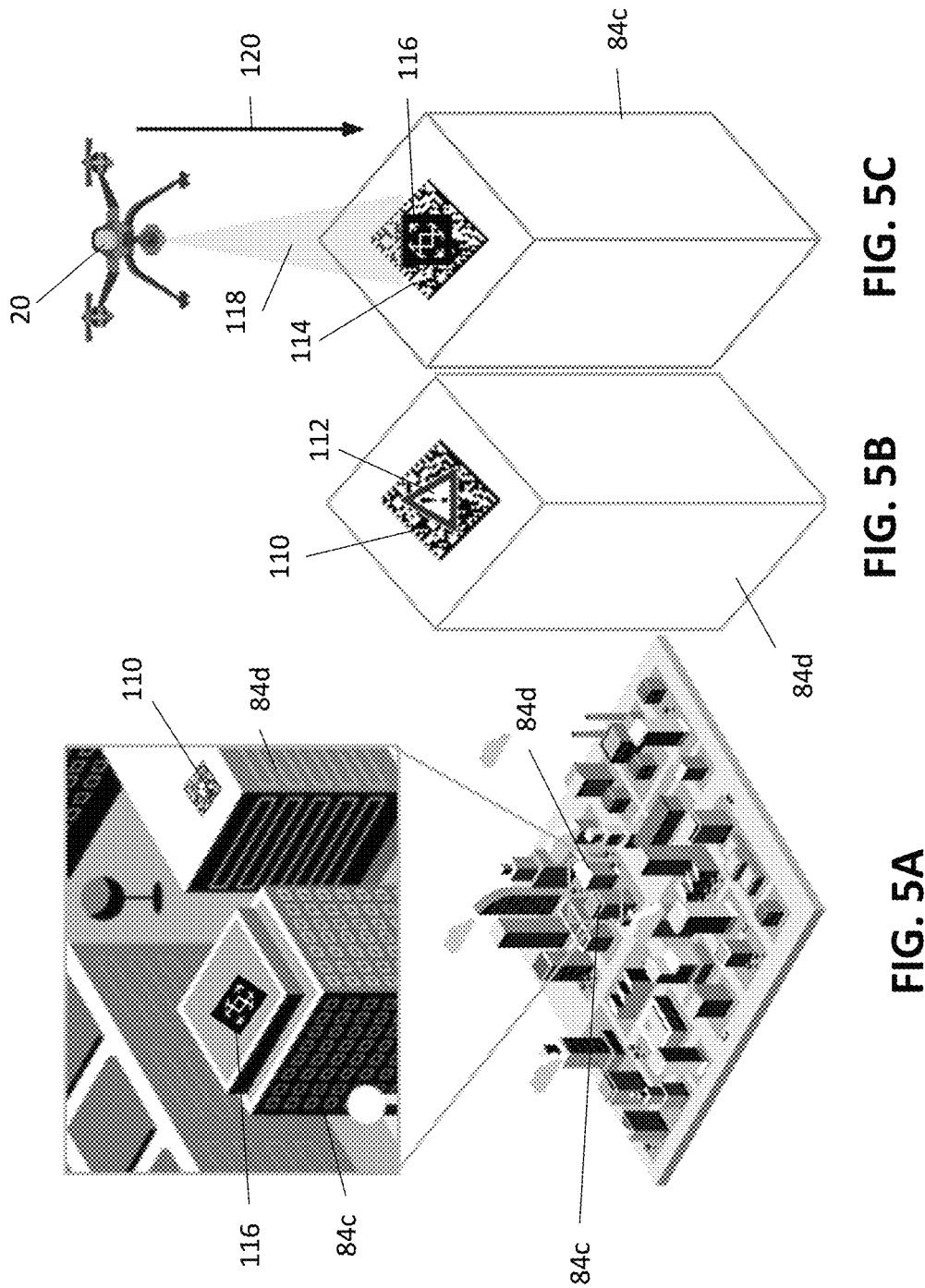
FIG. 5A is a perspective view of landing zones available for use of UAVs utilizing the system of an embodiment of the present invention.
FIG. 5B is a perspective view of an emergency landing zone available for use of UAVs utilizing the system of an embodiment of the present invention.
FIG. 5C is a perspective view of a landing zone available for use of UAVs utilizing the system of an embodiment of the present invention.

As shown in FIG. 5A, landing zones of any type may be positioned with a geographic region. Landing zones may be positioned upon buildings, 84*c*, 84*d*, upon the ground, or upon structures that are either moveable or stationary. Landing zones may include emergency landing zones 110, and non-emergency landing zones 116. FIG. 5A shows the position of two landing zones within a group of buildings, and a close-up of the position of the landing zones upon such buildings.

FIG. 5B shows an emergency landing zone 110 positioned upon the top of a building 84*d*. The emergency landing zone may incorporate an emergency design 112 or other element that identifies (whether visually or otherwise) the landing zone as an emergency landing zone. FIG. 5C shows a non-emergency landing zone 114 positioned upon the top of a building 84*c*. The non-emergency landing zone may incorporate a non-emergency design 116 or other element that identifies (whether visually or otherwise) the landing zone as a non-emergency landing zone.

In some embodiments of the present invention, a guiding tool may integrated with any type of landing zone, whereby one or more sensors attached to a UAV can sense the landing zone, and the sensors can be utilized to generate an guiding zone 118, whereby the UAV is aligned with the landing zone and guided towards the landing zone (as shown by arrow 12). Through the function of the guiding tool, the UAV can land directly upon the landing zone. In embodiments of the present invention, the sensors may incorporate any of the following types of sensors, one or more light detection and ranging (LIDAR) sensors, one or more infrared sensors, or other types of sensors that achieve the function disclosed herein.

As one example, landing zones may incorporate computer vision whereby the landing zone is marked. The UAVs may utilize camera vision to land upon such marking. To reach a landing zone, a UAV may be guided by the flight highway control system off the flight highway and along a flight path formed of datapoints, to a point near to the landing zone, and from that point the UAV will transfer control to the computer vision system to complete the landing of the UAV upon the marked location of the landing zone. Other configurations for landing zones and the one or more sensors incorporated in a UAV are also possible.

As well as emergency landing zones and safety emergency landing zones, other types of landing zones may be created in the present invention, including non-emergency landing zones that are mid-flight path landing zones positioned upon buildings along the flight highway route, or upon other structures along the flight highway route, or in locations along the flight highway route (e.g., open fields and other locations where it would be safe to land a UAV). For example, a mid-flight path landing zone could be located upon building 86 as shown in FIG. 3. Such mid-flight path landing zones may incorporate computer vision whereby the landing zone is marked. The UAVs may utilize camera vision to land upon such marking. To reach a mid-flight path landing zone, a UAV may be guided by the flight highway control system off the flight highway and along a flight path formed for datapoints, to a point near to the mid-flight path landing zone, and from that point the UAV will transfer control to the computer vision system to complete the landing of the UAV upon the marked location of the mid-flight path landing zone. Mid-flight path landing zones may be public or may be specific to an organization.

An embodiment of the present invention may incorporate a flight highway control system, such as that shown in FIG. 1. Such a system comprises a ground control station 22, a server 14 accessible via the internet 16 (being a cloud server), a cell tower 24, a continuously operating reference station (CORS) 18, one or more satellites 12a, 12b, and one or more UAVs 20. The ground control station may be a laptop, tablet, or other computing device. The ground control station determines the flight path of the UAV based upon information provided to it relating to the UAV as well as the intended starting location and destination location of the UAV for a particular flight (e.g., its mission).

Generally UAVs are flown in accordance with radio telemetry, but this can only be utilized while a UAV is within the line of sight of the controller. The present invention incorporates LTE (e.g., 4G or 5G) functionality for data transmission between the ground control station 22 and the UAV 20. The system is operable to support several bilateral data transmissions, including the following:

between the ground control station and a cell tower 40 (LTE);

between the cell tower and the UAV 36 (LTE);

between the ground control station and the UAV 38, as occurs specifically for UAVs on flight paths that are not beyond the visual line of sight of the controller;

between the cell tower and the server 46 (MAVlink™ over TCP/IP, Dynamic Rerouting+Telemetry);

between the ground control station and the server via the Internet 42 (Route+Telemetry, Route Request);

between the UAV and one or more satellites 28, 32, as facilitates improved accuracy of UAVs to follow and fly along the flight highway lanes as such lanes are positioned and defined in accordance with the datapoints;

between the one or more satellites and the CORS station 30, 26, as facilitates improved accuracy of UAVs to follow and fly along the flight highway lanes as such lanes are positioned and defined in accordance with the datapoints; and between the UAV and the CORS station 19, as facilitates improved accuracy of UAVs to follow and fly along the flight highway lanes as such lanes are positioned and defined in accordance with the datapoints.

Transmissions between each UAV and the one or more satellites and one or more satellites and the CORS station will help identify the exact location of a UAV in-flight.

The CORS station transmits such location data to the UAV that relays the location information to the ground control station (whether directly, or via the LTE transmissions via the cell tower). In this manner the ground control station has real-time or virtually real-time data regarding the location of the UAV in-flight. The transmission connection between the ground control station and the server, permits storing and extraction of data that can be utilized to control the route of the flight highway (e.g., permits in-flight alterations if the flight highway is required to be altered due to any in-air or ground obstacle to the flight highway route—e.g., buildings, weather, fires, no-fly zones, birds, etc.).

The ground control station may be controlled by the owner or user of the UAV. The ground control station may be utilized by the owner or user of the UAV to fly the UAV to the flight highway. Once a UAV reaches the flight highway control of the flight of the UAV will be controlled by the flight highway control platform stored and functioning in the server. A owner/user of a UAV may cause the UAV to leave the flight highway, for example, such as if the mission of the UAV is to inspect the exterior surface of multiple buildings within a city, the UAV may leave the flight highway when it is close to each building it is to inspect. The owner/user may control the UAV during the inspection, and then fly the UAV back to the flight highway. The flight highway control system is further operable to control a UAV from its flight starting location through to its destination, such flight path route including flying upon a portion of the flight highway.

Platform

A user who owns a single UAV, or a user who is an owner of multiple UAVS, may view one or more screens that provide information relating to the flight of its one or more UAVs, in the form of a user dashboard. The user dashboard may display information relating to the position of the UAV, the battery life of the UAV, the time remaining in the flight along the flight path, the height (altitude) of the UAV, the speed the UAV is travelling at, and the map location of the UAV, etc.

Figures 4A, 4B:
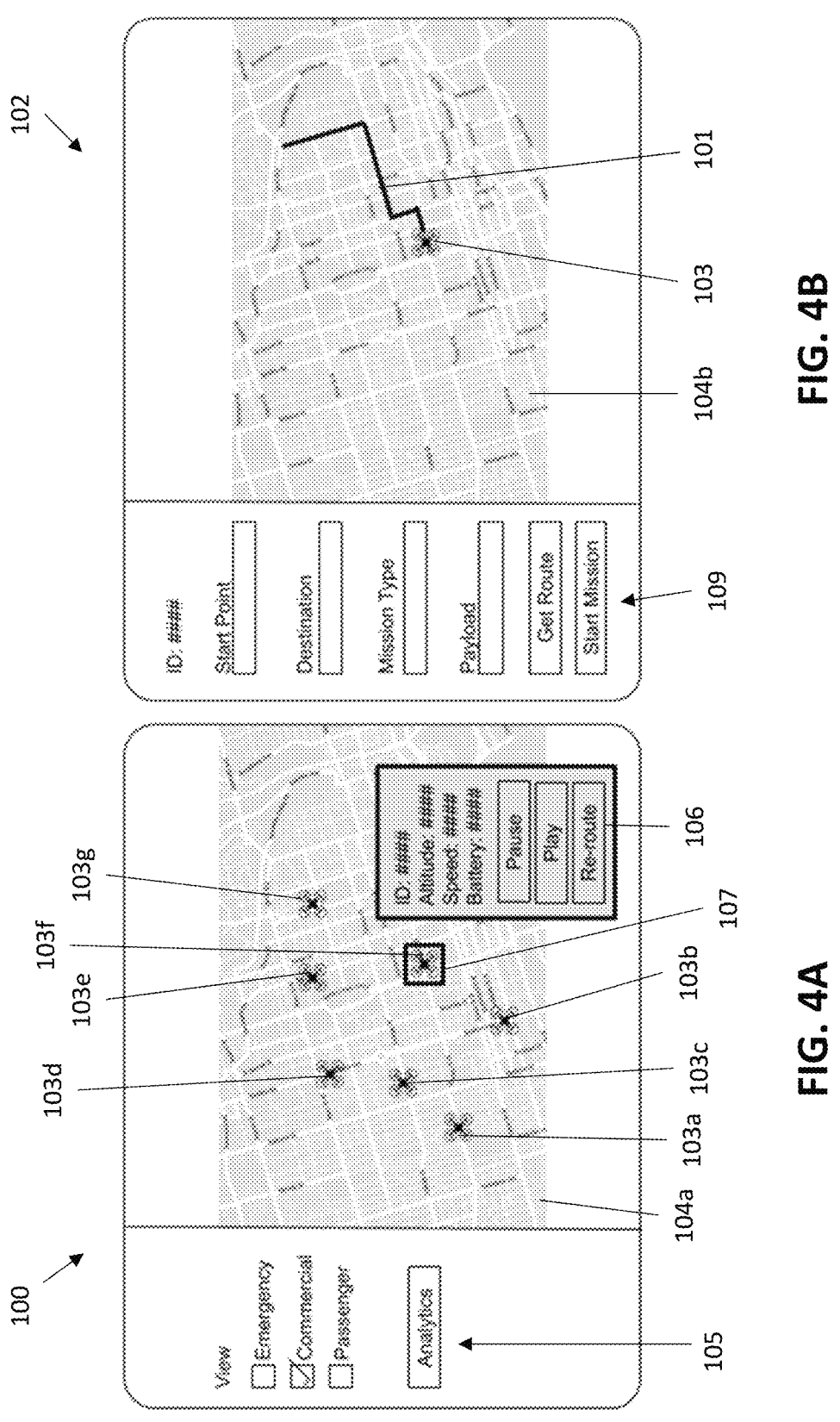
FIG. 4A is a view of a screen displayed to administrative user of the system of the present invention as incorporated in an embodiment of the present invention.
FIG. 4B is a view of a screen displayed to non-administrative user of the system of the present invention as incorporated in an embodiment of the present invention.

As shown in FIG. 4B, a user dashboard or screen may be displayed to an owner of one or more UAVs, or to a controller of one or more UAVs. The dashboard or screen may display a map 104b showing the flight path 101 and present location of at least one UAV 103, flying within the location shown on the map. UAV information 109 may be displayed relating to one or more UAVs on the map. Such information may incorporate other features, such as a Start Mission button. Buttons or certain information may be selected by a user to cause a particular outcome, such as a Start Mission button that when selected will cause the flight of one or more UAVs to be initiated along a flight path.

An official of a geographic area wherein a flight highway is located may view one or more screens that provide information relating to the flight of one or more of the UAVs that are flying upon the flight highway, or that are in-flight and are moving to fly upon the flight highway, or were flying upon the flight highway and have flown away from the flight highway, in the form of an administrator dashboard.

The administrator dashboard provides a real-time or virtually real-time view of the UAVs flying within the geographic area. As discussed herein, filters may be applied to this view to view only a single UAV or to view subsets of UAVs. Alert information relating to any of the UAV flights can be displayed. The administrator (officer) can obtain information relating to individual UAVs or subsets of UAVs, and their missions, while viewing all UAVs in-flight. The administrator screens further permit the administrator (official) to pause traffic on the flight highway and apply other C2 commands. The administrator screens could further permit the view of one or more layers and/or lanes of the flight highway at a time, to thereby identify traffic issues within a lane.

As shown in FIG. 4A, an administrator dashboard or screen may display a map 104*a* showing the location of one or more UAVs 103*a*, 103*b*, 103*c*, 103*d*, 103*e*, 103*f* and 103*g*, flying within the location shown on the map in real-time or virtually real-time. Filter information options 105, whereby the information shown about one or more UAVs on the map may be controlled, may be provided on the dashboard. For example, one or more types of UAVs may be displayed (e.g., emergency, commercial, passenger, etc.) upon the map at one time. Filters may further be set in accordance with analytic information pertaining to one or more UAVs (e.g., low battery life, payloads over a certain weight, etc.). A panel 106, incorporating information pertaining to one or more UAVs shown on the map, and other features, such as Play, Pause and Re-route buttons, may be displayed to an administrative user.

Buttons or certain information may be selected by an administartor user to cause a particular outcome, such as a Pause button that when selected will cause one or more UAVs to be paused in their flight along a flight path. A user may further select one or more UAVs and a selection indicator 107 will display to highlight the one or more UAVs that have been so selected. Information in the dashboard may be filtered to only relate to such selected one or more UAVs, and functions such as play, pause and re-route may be applied only to the selected UAV in some embodiments of the present invention.

In some embodiments of the present invention, the administrator dashboard screens permit the administrator to approve a UAV prior to engaging in any flight using the present invention. In this manner, UAV users/owners are be required to register their UAVs before they would be permitted to fly within a geographic area. Moreover, UAV flights may be required to fly along the flight highway within the geographic area, or if flying off the flight highway they must be flying in accordance with a flight path/plan generated by the present invention. The administrator may further have the option to set the speed limits for one or more lanes of the flight highway, or to set other parameters relating to the permitted flight of UAVs. In this manner, the present invention can be utilized to impose regulations and rules upon UAVs in-flight within a geographic area.

Figure 2:
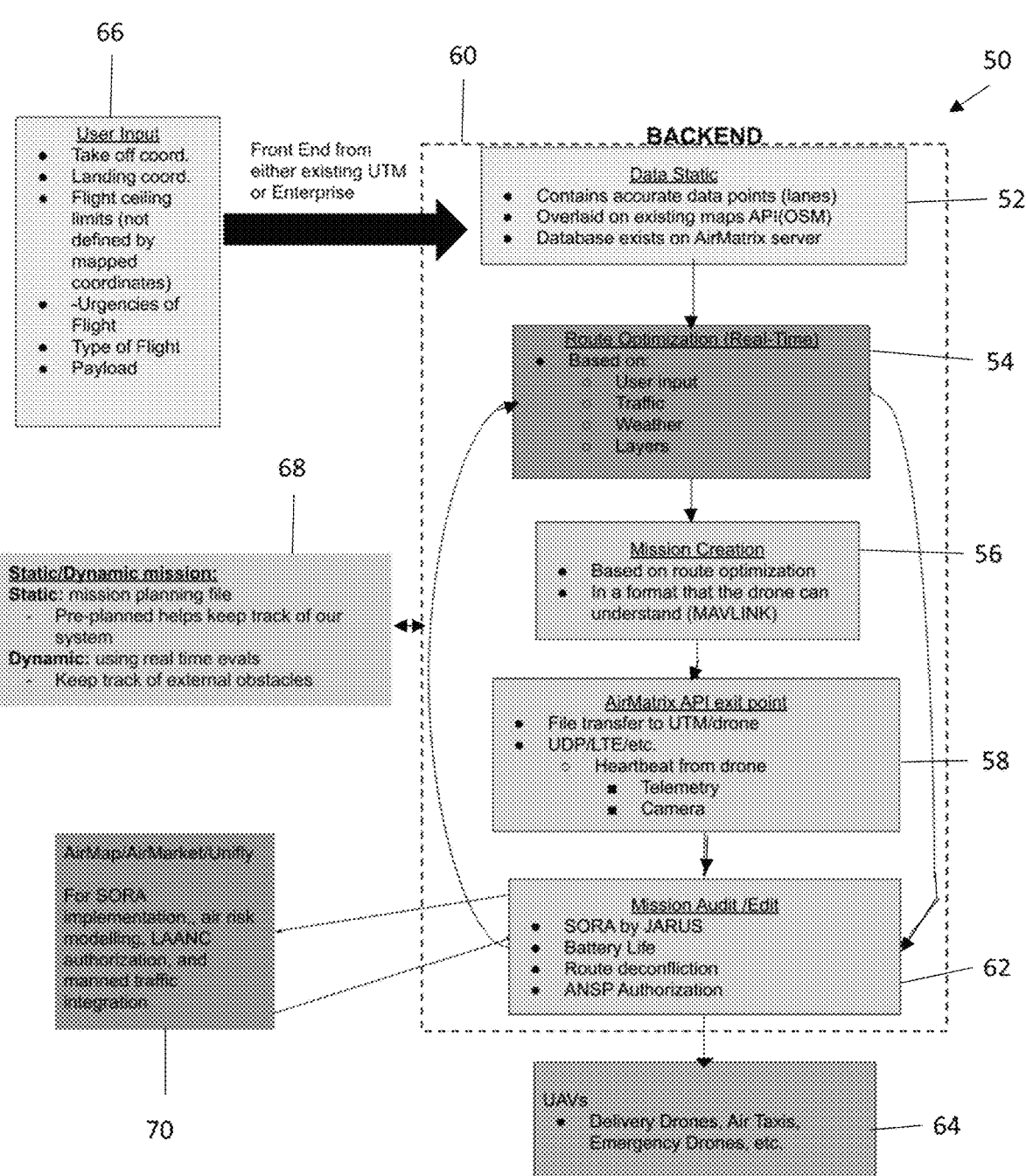
FIG. 2 is a systems diagram of the software architecture of a UAV flight highway system of an embodiment of the present invention.

An example of an embodiment of the flight highway control platform 50 of the present invention, is shown in FIG. 2. The platform incorporates a user input module 66 whereby a user can provide information relating to the flight of a UAV and its mission. Such information can include any of the following: the starting location of the UAV flight provided as the take-off coordinates (e.g., a named location such as a building or city site, an address, a longitudinal/latitudinal point, etc.); the destination location of the UAV flight provided as the landing coordinates (e.g., a named location such as a building or city site, an address, a longitudinal/latitudinal point, etc.); the flight ceiling limits (being the highest altitude that the UAV can fly at for the mission) that will not necessarily be defined by any mapped coordinates; the urgency of the flight (e.g., an indication that a flight is for emergency services, etc.); the type of mission that the flight is for or other type of flight information; and the payload that the UAV will transport (if any). This data is transmitted from the ground control station to the flight highway control platform on the server.

In some embodiments of the present invention, the information collected by the user input module may be obtained from a third party system that is incorporated with the present invention. For example, a government system that registers and regulates UAVs in a region may obtain such information and transfer this information to the present invention.

The data transmitted to the user input module is then transferred to the platform backend 60. The platform backend incorporates several modules operable to process data relating to the UAV flight and the control of UAVs simultaneously (whether there be one UAV or multiple UAVs in flight).

The data static module 52 stores the datapoints collected for the geographic area, the datapoints overlaid upon a map of the geographic area and the results of processing such datapoints and map, as described herein. The data static module is operable to store such information and to transmit such information to the route optimization (real-time) module 54.

The route optimization (real-time) module 54 receives information from the data static module, from the user input module, and from the route deconflicting aspect of mission audit. The server of the present invention receives information relating to multiple variables. Using this information, the system can recognize where multiple UAVs are located in the flight highway lanes, along flight paths, and near the flight highway. The present invention can utilize such information further to reroute flight paths of one or more UAVs, or reroute flight highway lanes, to prevent one or more UAVs from flying to locations that are identified by the flight highway controller to be locations where one or more UAVs should not fly. For example, the flight highway controller may alter the flight path of a UAV to avoid an UAV colliding with another UAV. The flight highway controller may further reroute a flight highway lane to avoid any UAVs along a lane from flying into a location wherein there is significant airborne debris (e.g., smoke particles or other debris) that could damage a UAV or adversely affect its function. The flight highway controller may further reroute a single UAV, multiple UAVs or a flight highway lane for other purposes, as described herein, to produce an efficient flow of UAV traffic within the flight highway.

This module utilizes such information and data to optimize the route of the flight highway, as well as the flight path of each UAV. The route optimization (real-time) module may receive information from third party sources, including weather information, construction information, special even information (e.g., carnivals, air shows, etc.), and other information that will affect travel of UAVs on the flight highway, as well as travel of a specific UAV along its flight path. Notably, the flight highway control platform will include in the flight path a route to reach the flight highway, a route along the flight highway, and a route from exiting the flight highway to a destination point. The flight path will include an optimized route to cause the UAV to reach the flight highway altitude and route as efficiently and safely as possible, and to exit the flight highway for any reason, including to reach a destination location or to reach a landing zone before completing an original flight path, in a manner that is efficient and safe.

In some embodiments of the present invention, a UAV may be utilized to carry and deliver a secure package. For example, a UAV may be utilized to carry and deliver prescription drugs from a pharmacy to a patient, legal documents between parties in a transaction, or other secure packages. The present invention may incorporate a sensor or other tool operable to confirm receipt of such secure package by the intended party, for example, such as by the UAV scanning a quick response (QR) code, scanning or receiving the recipient's signature, scanning or receiving the recipient's biometric data (e.g., an eye scan or fingerprint), or another tool whereby the identify of the recipient may be verified by information collected by the UAV and transferred to the system of the present invention for processing and verification.

This module may further receive information relating to travel along the flight highway, including information relating to traffic, lanes (layers) upon the flight highway, and other flight highway information. Such information may be generated by the flight highway control system and transmitted to the route optimization (real-time) module via the transmissions permitted therein. This module may receive information from third party sources, as well as information relating to the flight highway in real-time, or virtually real time.

The route optimization (real-time) module will utilize the information it receives to optimize the flight path for each UAV. For example, if the weather information indicates a storm is approaching, the flight path, and flight highway, may be altered to avoid storm cells. As another example, the payload of a UAV may indicate that the UAV cannot be flown above a particular altitude, and the flight path will be generated to accommodate such a limitation. The flight plan will further be generated that entails the expected altitude, speed, and other functions of the UAV along the flight path. For example, a UAV flying at a higher speed may have a shorter battery life than a UAV flying at a lower speed, and therefore the flight plan will ensure that the function of the UAV along a flight path is sustainable. These and other criteria are utilized for determining an optimized flight path for each UAV. As another example, the flight mission may indicate that a UAV is conducting an emergency services flight, and the flight plan may cause the UAV to fly along the lane reserved for emergency services UAVs on the flight highway. The route optimization (real-time) module will consider all of the information that it receives and produce a flight plan for each UAV, and routes for the flight highway. Such flight plans and routes for the flight highway will optimize the efficiency and safety of the flight for each UAV. The route optimization (real-time) module can transfer information to the miss-audit/edit module, or the mission creation module 56.

The mission creation module 56 is operable to process the information it receives from the route optimization (real-time) module to generate a flight plan for a UAV, a portion of such flight plan being along the flight highway. The flight plan may further be generated to be in a file format that a UAV can understand (e.g. MAVlink™ or another format that a UAV can understand). The flight plan in such file format is transferred by the mission creation module to the API exit point module 58.

The API exit point module 58 is operable to transfer the flight plan file to the UAV, and to transfer traffic management information to the UAV in-flight, such as rerouted flight planes, flight paths to landing zones, and flight highway route alterations, sent to the UAVs flying upon the flight highway in the form of an altered flight plan. The flight plane consists of a series of datapoints the UAV is to fly to, as described herein. A flight path is generated for each UAV individually and each UAV is monitored by the system in-flight by the system of the present invention, through the transmission of data from the UAV to the system. The information will be provided to the UAV(s) via LTE transmission other types of transmissions, in accordance with the flight highway control system.

The API exit point module may further receive information from the UAV(s) in-flight on flight paths generated by the flight highway control platform. Such information may be collected by a UAV via one or more sensors incorporated in or attached to a UAV (e.g., obstacle sensors, battery life sensors, etc.), one or more cameras incorporated in or attached to a UAV, or via telemetry. Such information may include the position of the UAV, the battery life of the UAV, the time remaining on flight in accordance with the flight plan, the altitude of the UAV, the flight speed of the UAV, the map location of the UAV, and other information relating to the flight and the function of the UAV. This information may be transmitted from this module to other modules in the backend to assist in particular with flight highway route optimization to be generated for UAVs in-flight along the flight highway and transmitted to such UAVs, or altered flight plans as requested. The API exit point module further transmits information to the mission audit/edit module 62.

The mission audit/edit module 62 receives the information transmitted from the backend system and the API exit point module in particular. This module processes this information and generates a specific operations risk assessment (SORA) relating to the UAV flight and obstacles to the flight path/plan. This module may further determine the battery life of the battery of each UAV, and whether each UAV has sufficient battery life to complete its flight path. This module may determine that the flight path route of a UAV, or a flight highway lane, needs to be rerouted for a UAV to avoid conflict with other UAVs, or for other reasons. This module may further determine if any authorization of Aircraft Network Security Program (ANSP) is required and whether such required authorization has been obtained for each UAV. Information generated by this module may be transmitted to the route optimization (real-time) module 54 and processed thereby, as described herein.

Information generated by this module may also be transmitted to a UAV. For example, if a UAV is determined to lack battery life to complete a flight path, an altered flight path may be generated for such UAV and transferred to the UAV by the system such that the UAV is directed to a landing zone. As another example, if the flight path for a UAV is rerouted, or a flight highway lane is rerouted, details of the rerouted flight path or flight highway lane will be transmitted to the UAV.

In some embodiments of the present invention, the mission audit/edit module may transmit information to an airmap/airmarket/unifly module 70. The airmap/airmarket/unifly module may process the information for SORA implementation, to produce air risk modelling. The airmap/airmarket/unifly module may further generate a low altitude authorization notification capability (LAANC) assessment to determine if the flight path/plan or the actual flight of the UAV meets LAANC authorization requirements, or may perform other regulatory assessments. The airmap/airmar-ket/unifly module may further undertake assessments in light of manned traffic integration in the geographic area. The results of the processing of the airmap/airmarket/unifly module may be transmitted to the mission audit/edit module.

The mission audit/edit module may alter the flight path of a UAV, or cause the UAV to be directed to a safety emergency landing zone if the UAV is experiencing difficulties with its flight. The altered flight path may be transmitted to the affected UAV(s) via the flight highway control system of the present invention.

The flight highway control platform further incorporates a static/dynamic mission module 68, operable to transmit and receive information from the backend 60. The static/dynamic mission module stores the information relating to the static aspects of the UAV flight path, namely the mission planning information collected prior to the UAV being in-flight on the flight path/plan. The static information can be retrieved and transmitted to the backend. The static/dynamic mission module further stores dynamic information, being real-time information gathered while a UAV is in-flight. This information is utilized to track obstacles to a flight path/plan and the flight highway. The static information can be retrieved and transmitted to the backend. UAV flight log information may further be transmitted to this module after each UAV flight concludes, and be stored as dynamic information.

The static and dynamic information can be processed by the static/dynamic mission module and utilized for machine learning and artificial intelligence (AI) development purposes for the present invention. For example, the occurrence of flight obstacles may be predicted in the future based upon such machine learning and/or AI.

In other embodiments of the present invention, the system of the present invention may incorporate one or more third party systems (such as third party traffic management and monitoring systems). Such third party systems may be operable to monitor and enforce airspace permissions in a particular jurisdiction, or may have other functions or features. In such embodiments, the system of the present invention would control UAV flights and may utilize information or functions of the third party system in relation thereto (i.e., airspace permission from third party system, etc.).

When integrated with a third party local system, the third party system could function as a front end module for the system of the present invention. For example, the third party may undertake the registration of UAVs and other functions to cause UAVs of which it is made aware to comply with local jurisdictional requirements imposed upon UAVs in such location. The third party system may transfer information relating to registered UAVs to the present invention, whereby such UAVs are recognized as registered for the purposes of the present invention. The present invention could then create flight paths for such UAVs when each such UAV is to embark on a mission, or could allow a UAV to join the flight highway mid-flight.

As another example, the present invention may integrate with a third party system, whereby the present invention is the system initially utilized by the owner of a UAV, to register the UAV, create flight paths, and control flights of the UAV, as described herein. The present invention may provide information about each such UAV to the third party system, and such third party system may provide services to the UAV owner in accordance with the function of such third party system. A variety of types of third party systems may therefore be incorporated to function with the present invention for a variety of purposes.

Multiple UAVs

Although the description of the flight highway control platform is described above in reference to a single UAV, the platform is operable to generate flight plans/paths and control the flights of multiple UAVs simultaneously. Moreover, such UAVs may belong to multiple individuals and organizations that provide information to the flight highway control platform, and can connect their UAVs so as to be in transmission communication with the flight highway control system, as described herein. Thus, flight paths/plans generated for UAVs in accordance with the present invention will be created to avoid collisions between multiple UAVs flying on, to, and from, the flight highway.

Additionally, although a single ground control station and UAV are shown in FIG. 1, the present invention facilitates multiple ground control stations. Each ground control station is operable to control the flight of one or more UAVs. The multiple ground control stations may each be connected to transmit and receive information from the flight highway control platform, in accordance with the flight highway control system, as described herein.

It will be appreciated by those skilled in the art that other variations of the embodiments described herein may also be practiced without departing from the scope of the invention. Other modifications are therefore possible. For example, the present invention could be utilized by semi-manned aerial vehicles, being aerial vehicles that can be flown by a user (whether the user is within the vehicle or located externally from the vehicle) but can also be controlled by the flight highway control system of the present invention. The present invention may further be applied to cross border UAV travel, whereby geographic areas that include two or more countries could coordinate their regulations for UAV travel, to increase the efficiency and safety of such cross-border UAV travel.

We claim:

1. A system for a UAV flight highway and management thereof, comprising:
   (a) a ground control station operable to transmit data to and from one or more UAVs;
   (b) a server operable to identify the UAV flight highway, and to transmit data to and from the ground control station;
   (c) a geographic locator communication device operable to transmit data to and from the one or more UAVs;
   (d) a communication transmitter operable to transmit data to and from the ground control station and to and from the one or more UAVs; and
   wherein the one or more UAVs are guided along the UAV flight highway through communication with the ground control station,
   the UAV flight highway system is generated to define one or more flight highway lanes that are positioned in one or more layers of flight highway lanes, each of the flight highway lanes in one of the one or more layers being equidistant from the ground,
   the one or more flight highway lanes are defined as a series of datapoints, each of such flight highway lanes being defined by such datapoints to be in proximity to such other flight highway lanes to collectively form the UAV flight highway, and the center of the UAV is aligned with each datapoint during travel along the one or more flight highway lanes,
   the series of datapoints defining the one or more flight highway lanes are spaced in proximity to each other, whereby datapoints are in closer proximity in sections of said flight highway lanes that are not straight, and in farther proximity in straight sections of the flight highway lanes and the spacing of datapoint cause travel of the UAV at different speeds and the exactitude of the height of the height of said flight highway lanes from the ground, and the datapoints spacing produces travel of the UAV along the one or more flight highway lanes, the proximity of the series of datapoints from each other controls the speed of each of the one or more UAVs along each of the flight highway lanes, and the series of datapoints being at different proximities from each other along different flight highway lanes will cause the one or more UAVs to travel at different speeds along different flight highway lanes, such that the one or more UAVs will travel at a slower speed where the series of datapoints are in closer proximity and at a faster speed where the series datapoints are in farther proximity, and such datapoints are generated via a global navigation satellite system receiver that collects distance-based data within a specific geolocation wherein the flight highway is to be located, travel by the UAV along the one or more flight highway lanes is in accordance with one or more rules for travel applicable to at least one of the one or more flight highway lanes, such one or more rules control speed of travel, times of travel, direction of travel, and the type of UAV that can travel along such flight highway lanes, and such one or more rules vary for flight highway lanes, and the UAV may move between the one or more flight highway lanes during a single flight.

2. The system of claim 1, wherein the ground control station controls the flight of each of the one or more UAVs along the flight highway.

3. The system of claim 1, wherein the ground control station is operable to generate a flight path for each of the one or more UAVs in accordance with one of the following options:

(a) from the location where said UAV starts its flight to the flight highway, along the flight highway, and from the flight highway to a final destination of said UAV;

(b) whereby one of the one or more UAVs starts joins the flight highway in flight and controls the flight of said UAV along the flight highway until said UAV exits the flight highway;

(c) whereby one of the one or more UAVs starts joins the flight highway in flight and controls the flight of said UAV along the flight highway and from the flight highway to a final destination; or (d) from the location where said UAV starts its flight to the flight highway, along the flight highway, until said UAV exits the flight highway.

4. The system of claim 3, wherein the ground control station may generate an altered flight path for any of the one or more UAVs in accordance with information received by the ground control station for said UAV.

5. The system of claim 1, wherein the ground control station may generate a rerouted flight highway to avoid risk to at least one of the one or more UAVs.

6. The system of claim 1, further comprising one or more landing zones where at least one of the one or more UAVs may be directed to land by the ground control station.

7. The system of claim 1, wherein the ground control station receives and monitors information relating to the battery level of the one or more UAVs.

8. The system of claim 1, wherein the ground control station displays a dashboard to an administrator use showing real-time information relating to each of the one or more UAVs.

9. The system of claim 8, wherein the dashboard provides control functions to the administrator user, including:

(a) pause control whereby the flight or at least one of the one or more UAVs is paused;

(b) play control whereby the flight of any paused UAV is resumed;

(c) return to home control whereby the flight path of any UAV is altered to route said UAV to its home location.

10. The system of claim 1, wherein the one or UAVs can move between lanes, and move between layers of the flight highway.

11. The system of claim 1, wherein:

(a) one or more lanes of the flight highway are reserved for specific types of UAVs; or (b) one or more layers of the flight highway are reserved for specific types of UAVs.

12. The system of claim 1, wherein one or more intersections are incorporated in the flight highway, and the ground control station controls the travel of the one or more UAVs across all intersections in accordance with rules and information received from each of the UAVs.

13. The system of claim 1, wherein all of the one or more UAVs that fly along the flight highway must be registered with the ground control station.

14. The system of claim 1, wherein the server stores datapoints that are longitudinal and latitudinal pinpoint references and the flight highway is defined by a series of such datapoints.

15. The system of claim 1, further comprising a third party system integrated with the server, whereby information is transferred to and from the server and the third party system, and such information is utilized by the ground control station.

16. A method for a UAV flight highway and management thereof, comprising the steps of:

(a) one or more UAVs being registered on a flight highway system that comprises:

(i) a ground control station operable to transmit data to and from one or more UAVs;

(ii) a server operable to identify the UAV flight highway, and to transmit data to and from the ground control station;

(iii) a geographic locator communication device operable to transmit data to and from the one or more UAVs; and (iv) a communication transmitter operable to transmit data to and from the ground control station and to and from the one or more UAVs;

(b) a request for each of the UAVs being to access the flight highway being received by the flight highway system and being approved, and a flight plan being generated for said UAV, prior to a UAV flying along the flight highway;

(c) the flight highway system monitoring information from each UAV flying along the flight highway system, and environmental information relating to the geographic region of the flight highway system, and generating either, altered flight plans, or an altered flight highway, in accordance with such information; and (d) the flight highway system flying multiple UAVs along the flight highway simultaneously, wherein the UAV flight highway system is generated to define one or more flight highway lanes that are positioned in one or more layers of flight highway lanes, each of the flight highway lanes in one of the one or more layers being equidistant from the ground and in proximity to each other and within the UAV flight highway, the one or more flight highway lanes are defined as a series of datapoints, and the center of the UAV is aligned with each datapoint during travel along the one or more flight highway lanes, and the series of datapoints defining the one or more flight highway lanes are spaced in proximity to each other, whereby datapoints are in closer proximity in sections of said flight highway lanes that are not straight, and in farther proximity in straight sections of the flight highway lanes and the spacing of datapoint cause travel of the UAV at different speeds and the exactitude of the height of said flight highway lanes from the ground, and the datapoints spacing produces travel of the UAV along the one or more flight highway lanes, the proximity of the series of datapoints from each other controls the speed of each of the one or more UAVs along each of the flight highway lanes, and the series of datapoints being at different proximities from each other along different flight highway lanes will cause the one or more UAVs to travel at different speeds along different flight highway lanes, such that the one or more UAVs will travel at a slower speed where the series of datapoints are in closer proximity and at a faster speed where the series datapoints are in farther proximity, and such datapoints are generated via a global navigation satellite system receiver that collects distance-based data within a specific geolocation wherein the flight highway is to be located, travel by the UAV along the one or more flight highway lanes is in accordance with one or more rules for travel applicable to at least one of the one or more flight highway lanes, such one or more rules control speed of travel, times of travel, direction of travel, and the type of UAV that can travel along such flight highway lanes, and such one or more rules vary for flight highway lanes, and the UAV may move between the one or more flight highway lanes during a single flight.

* * * * *